(12) United States Patent
Iyer et al.

(10) Patent No.: US 11,569,934 B2
(45) Date of Patent: Jan. 31, 2023

(54) PBCH TIMING AND ASPECTS OF POLAR CODE DESIGN

(71) Applicant: IPLA Holdings Inc., New York, NY (US)

(72) Inventors: Lakshmi R. Iyer, King of Prussia, PA (US); Allan Y. Tsai, Boonton, NJ (US); Qing Li, Princeton Junction, NJ (US); Joseph M. Murray, Schwenksville, PA (US)

(73) Assignee: IPLA HOLDINGS INC., New York, NY (US)

( * ) Notice: Subject to any disclaimer, the term of this patent is extended or adjusted under 35 U.S.C. 154(b) by 0 days.

(21) Appl. No.: 17/692,258

(22) Filed: Mar. 11, 2022

(65) Prior Publication Data

US 2022/0231784 A1 Jul. 21, 2022

Related U.S. Application Data

(63) Continuation of application No. 16/637,536, filed as application No. PCT/US2018/045704 on Aug. 8, 2018, now Pat. No. 11,323,204.

(60) Provisional application No. 62/555,850, filed on Sep. 8, 2017, provisional application No. 62/543,699, filed on Aug. 10, 2017.

(51) Int. Cl.
*H04L 1/00* (2006.01)
*H04L 5/00* (2006.01)

(52) U.S. Cl.
CPC .......... *H04L 1/0041* (2013.01); *H04L 1/0057* (2013.01); *H04L 1/0067* (2013.01); *H04L 1/0071* (2013.01); *H04L 5/0007* (2013.01); *H04L 5/0048* (2013.01)

(58) Field of Classification Search
CPC ... H04L 1/0041; H04L 1/0057; H04L 1/0067; H04L 1/0071; H04L 5/0007; H04L 5/0048
See application file for complete search history.

(56) References Cited

U.S. PATENT DOCUMENTS

| | | | |
|---|---|---|---|
| 11,039,425 B2* | 6/2021 | Lin | H04W 72/0406 |
| 2011/0255631 A1* | 10/2011 | Pi | H04L 1/0072 |
| | | | 375/295 |
| 2017/0288703 A1* | 10/2017 | Shen | H03M 13/13 |
| 2018/0062781 A1* | 3/2018 | Ly | H04J 11/0076 |
| 2019/0037281 A1 | 1/2019 | Quan et al. | |
| 2019/0238159 A1* | 8/2019 | Gritsenko | H03M 13/3761 |
| 2019/0312681 A1* | 10/2019 | Luo | H03M 13/63 |

(Continued)

FOREIGN PATENT DOCUMENTS

CN 101779400 A 7/2010

OTHER PUBLICATIONS

3GPP TSG RAN WG1 Meeting #89 R1-1708158, Huawei et al., "Soft-Combining for PBCH", May 2017, 9 pages.

(Continued)

*Primary Examiner* — Freshteh N Aghdam
(74) *Attorney, Agent, or Firm* — Xsensus LLP

(57) ABSTRACT

PBCH design may affect timing indication in a wireless network and polar code interleaver design, among other things. Mechanisms may indicate half frame timing though de-modulation reference signal sequence initialization, de-modulation reference signal mapping order, or de-modulation reference signal resource element location.

20 Claims, 33 Drawing Sheets

(56) References Cited

U.S. PATENT DOCUMENTS

2019/0349913 A1* 11/2019 Xiong .................. H04L 1/0061
2019/0372816 A1* 12/2019 Si ........................ H04J 11/0073

OTHER PUBLICATIONS

3GPP TSG RAN WG1 Meeting #90 R1-1715093, Intel Corporation, "NR PBCH Design", Aug. 2017, 13 pages.
3GPP TSG WG1 NR ad-Hoc#2 R1-1711589, Samsung, "Timing Indication Based on SS Block", Jun. 2017, 8 pages.
3GPP TSG-RAN WG1 NR #2 R1-1709902, Sequans Communications, "Enhancements for Polar Code Construction", Jun. 2017, 5 pages.
Chairman Notes, 3GPP TSG RAN WG1 NR Ad-Hoc#2, Jun. 2017, Qingdao, China.
Ericsson, "Timing indication based on SS block", 3GPP NR Adhoc 2 meeting, Jun. 2017, Qingdao, China.
Ericsson: "MIB Contents for NB-IoT", 3GPP Draft; R2-162771-MIB Contents for NB-IoT, 3rd Generation Partnership Project (3GPP), Mobile Competence Centre; 650, Route Des Lucioles; F-06921, vol. RAN WG2, no. Dubrovnik, Croatia; Apr. 11, 2016-Apr. 15, 2016 Apr. 2, 2016, XP051082543.
Huawei, "Support of implicit soft combining for PBCH by polar code construction", 3GPP NR Adhoc 2 meeting, Jun. 2017, Qingdao, China.
Qualcomm Inc, "Design and evaluation of interleaver for polar codes", 3GPP NR Adhoc 2 meeting, Jun. 2017, Qingdao, China.
Sequans Communications: "Discussion on SS time index indication", 3GPP Draft; R1-1707219 SS Block Time Index Indication, 3rd Generation Partnership Project (3GPP), Mobile Competence Centre; 650, Route Des Lucioles; F-06921; France, vol. RAN WG1, no. Hangzhou, China; May 15, 2017-May 19, 2017 May 14, 2017, XP051272432.
3GPP TSG RAN WG1 Meeting #88 R1-1701704 20170207 Huawei,HiSilicon Channel coding for PBCH pp. 1-3 and FIGS.1-2.
3GPPTSG RAN WG2 #93 R2-162771 20160402 Ericsson MIB Contents for NB-IoT Full text.

* cited by examiner

PBCH TIMING AND ASPECTS OF POLAR CODE DESIGN

CROSS-REFERENCE TO RELATED APPLICATION

This application is a continuation of U.S. patent application Ser. No. 16/637,536 filed Feb. 7, 2020, which is the National Stage Application of International Patent Application No. PCT/US2018/045704 filed Aug. 8, 2018, which claims the benefit of U.S. Provisional Application No. 62/555,850 filed Sep. 8, 2017, and U.S. Provisional Application No. 62/543,699 filed Aug. 10, 2017, the disclosures of which are incorporated herein by reference in their entireties.

BACKGROUND

For timing indication through PBCH design the following should be considered: 1) three bits of synchronization signal (SS) block index are carried by changing the De-Modulation Reference Signal (DMRS) sequence within each 5 ms period; 2) it can be further considered to limit the number of bits carried in this way to 2 if carrying 3 bits is shown to cause problems; and 3) remaining bits of the timing information are carried explicitly in the New Radio-physical broadcast channel (NR-PBCH) payload.

SUMMARY

Disclosed herein is timing indication through PBCH design and polar code interleaver design, among other things.

The subject matter with regard to timing indication through PBCH design may include the following: 1) Sequences for DMRS timing indication; 2) Timing indication through Scrambling sequences, especially for half frame indication and LSB of SFN; 3) Time specific cover sequence and phase rotation for intra-slot timing indication; 4) Half frame timing indication through time-specific RE mapping; 5) Encoding timing bits in the polar code payload without Cyclic Redundancy Check (CRC); 6) Transmission chain including rate matching, interleaving, and scrambling for PBCH; or 7) Mapping timing bits (e.g., the most critical) to high reliability locations in the polar code payload. With regard to sequences for DMRS timing indication, the sequence designs may allow for: Cell-ID and timing based DMRS sequence; PBCH detection independent of the DMRS sequence; or Differential estimation of channel coefficient.

In summary, the subject matter with regard to polar code interleaver design may include the following: 1) A trapezoid interleaver which may apply to the polar codes in 3GPP NR; or 2) Interleaving pattern-based timing identification for PBCH timing.

Also disclosed herein are mechanisms to indicate half frame timing though DMRS sequence initialization, DMRS mapping order, or DMRS RE location. Techniques that may be considered low complexity may indicate the half frame timing bit with low latency to enable measurements of neighboring cells, preferably without requiring to decode the PBCH.

In addition, disclosed herein are scrambling code designs for a 2-stage scrambling mechanism for the PBCH in NR. A detailed design of scrambling codes enables SS block identification and SFN detection. PBCH DMRS design, half frame timing indication, or scrambling for PBCH may be considered in view of timing indication through PBCH design as disclosed herein.

Further disclosed herein are mechanisms for rate matching and interleaving of PBCH payload and for mapping the PBCH payload to the polar code input sequence. Polar code for PBCH disclosed herein may be considered in view of soft-combining of PBCH as disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EXAMPLES

Figure 1:
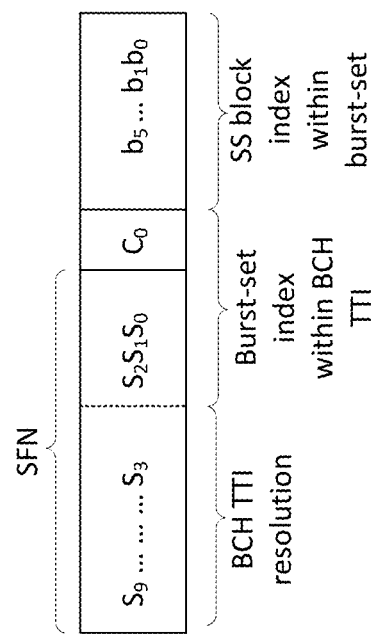
FIG. 1 illustrates an exemplary timing indication through PBCH design.

Timing information may be carried as shown in FIG. 1 and this information may be carried at least partly explicitly on the PBCH. Options for a hybrid solution may include the following: 1) SS block index within burst set that is carried by DMRS; 2) SS block index (2/3 bits) within burst that is carried by DMRS; 3) 2 bits of SFN carried by DMRS; and 4) SS block index (2 bits) within burst is carried by scrambling of both NR-PBCH and DMRS. For SS block index within burst set that is carried by DMRS, there may be 2 bits below 3 GHz, 3 bits for 3-6 GHz, or 6 bits above 6 GHz. This may achieve latency gain by enabling reception without decoding, but there are concerns on an ability to carry so many bits on DMRS and this may require the DMRS to be invariant.

For SS block index (2/3 bits) within burst that is carried by DMRS there may be 4/3 bits to indicate the burst in the burst set are carried in NR-PBCH payload. The possibility to achieve latency gain below 3/6 GHz or enable the UE to obtain the beam index for inclusion in SS block measurement reporting without NR-PBCH decoding, but it may require the DMRS to be invariant. With regards to 2 bits of SFN carried by DMRS, there may be a possibility to achieve complexity gain but no latency gain.

For SS block index (2 bits) within burst is carried by scrambling of both NR-PBCH and DMRS, there may be 4 bits to indicate the burst in the burst set are carried in NR-PBCH payload, which may achieve latency gain below 3 GHz. It is understood that 3 bits of System Frame Number (SFN) may be carried by NR-PBCH payload scrambling.

Techniques to allow soft-combining of PBCH across different beams may include the options: 1) Across SS burst set; 2) Within SS burst set; or 3) within a subset of an SS burst set, e.g. within an SS burst, within a number of slots, etc.

The following may be considered with interleaver for polar codes: 1) Channel bit interleaving; 2) the same sequence for each mother code size is used for all modulations; or 3) the UL sequence for a given mother code size is also used for the DL. With regard to the channel bit interleaving being applied, interleaving may be performed as part of the rate matching or after rate matching, in which interleaving may be a separate function and the interleaver may be function of the modulation.

An interleaver may include a triangular interleaver, which has the structure as disclosed below. The E bits are from rate-matching. The output bit sequence from the block interleaver is derived as follows:

(1) Determine the number of rows (columns) of the isosceles right triangle by finding minimum integer P such that $$E \leq \frac{P(P+1)}{2} = Q.$$

(2) If $Q > E$, then $Q - E$ dummy bits are padded such that $y_k = e_k$ for $k = 0, 1, 2, \ldots, E-1$ and $y_k = <\text{NULL}>$ for $k = E, E+1, \ldots, Q-1$. Then, the bit sequence $y_k$ is written into the isosceles right triangle row by row starting with bit $y_o$ in column 0 of row 0:

$$\begin{bmatrix} y_0 & y_1 & y_2 & \cdots & y_{P-3} & y_{P-2} & y_{P-1} \\ y_P & y_{P+1} & y_{P+2} & \cdots & y_{2P-3} & y_{2P-2} \\ y_{2P-1} & y_{P2} & y_{2P+1} & \cdots & & & \\ \cdots & \cdots & \cdots & \cdots & & & \\ y_{Q-6} & y_{Q-5} & y_{Q-4} & & & & \\ y_{Q-3} & y_{Q-2} & & & & & \\ y_{Q-1} & & & & & & \end{bmatrix}$$

The output of the block interleaver is the bit sequence read out column by column starting with bit $y_o$ in row 0 of column 0. The bits after block interleaving are denoted by $v_0, v_1, v_2, \ldots, v_{E-1}$, where $v_0$ corresponds to $y_0$, $v_1$ to $y_P \ldots$ and $v_{E-1}$ corresponds $y_{P-1}$. by skipping $y_k = <\text{NULL}>$.

There are issues with timing indication through PBCH design and interleaver design for polar codes that may be found in wireless networks, such as new radio. Further addressed herein is half frame time indication, scrambling code design for PBCH, and polar code design for PBCH.

Figure 2:
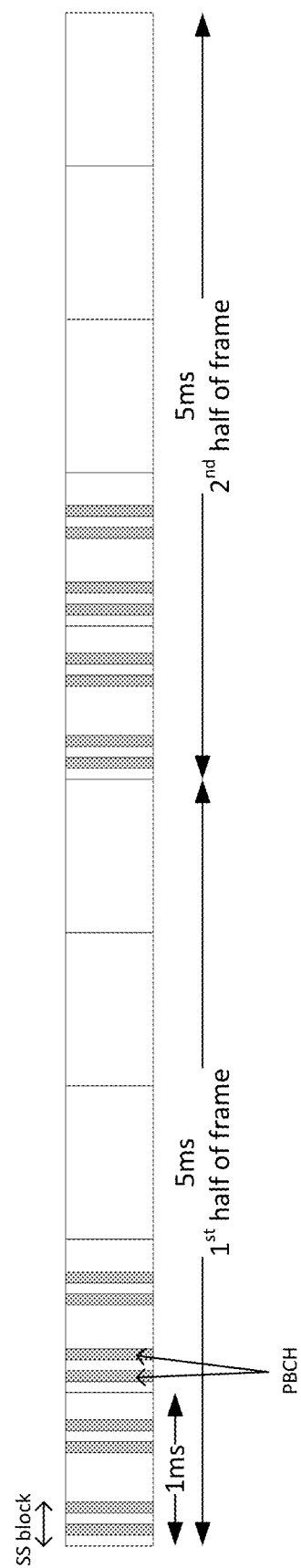
FIG. 2 illustrates an exemplary Half frame location of SS bursts.

With reference to timing indication in initial access, 3GPP NR supports up to 64 SS blocks in 5 ms, implying that 6 bits are required to indicate the SS block timings. Also at most 2 SS blocks may be placed in one slot for sub-carrier spacing, SCS<=120 KHz and 4 SS blocks may be placed in one slot-pair for 240 KHz SCS assuming a slot size of 14 symbols. So 1 bit of timing information (<=120 KHz) or 2 bits of timing information (240 KHz) should be conveyed to the UE. The SS bursts may occur in the 1st or 2nd half or both halves of a frame (depending on the periodicity) as seen in FIG. 2. So, there should be an indication of the 5 ms part within the frame. Further, 10 bits of SFN should be indicated.

The initial access signaling should provide a way to indicate the SS block timing within a frame and the SFN. Some timing information may be expressed explicitly as message bits in the PBCH payload while some timing information may be implicitly conveyed through the DMRS. Solutions on configuring these timing bits should be specified in 3GPP NR. Also, the solutions should enable soft-combining of the PBCH across multiple SS blocks/bursts. Appropriate mechanisms that may accomplish this are disclosed herein.

For additional perspective with regarding timing in NR, when a UE just enters a cell and it is trying to get access to the network, how does it find the timing of the system? It needs to know the frame timing. In LTE, it may be considered relatively simple, because this concept of beams was not so evolved in LTE. So in LTE, as soon as the desynchronization signals are found, timing (the frame timing) is known. But in NR, the problem is that there may be synchronization to a particular beam (e.g., the PSS and SSS of a beam is found) but it is not known which beam it is or in other words, a particular frame may include multiple beams. So which of those beams that a UE has locked onto may not be known and it may not be known where those PSS and SSS are located with respect to the starting and endpoint of that frame. That is a problem regarding timing that is addressed herein.

In addition, with regard to timing, with reference to FIG. 2, these 5 ms durations carrying the SS blocks may occur at some periodicity, the highest being every 5 ms, while the lowest may be once every 40 ms in which only the synchronization signals are transmitted. Which means there is an opportunity to accumulate the PBCH more or fewer times, depending on the periodicity. Given this, can there be something done with the PBCH signal itself or any of the peripheral signals to indicate all or some of the timing? The key bits of timing information may be provided to the DMRS (2 or 3 bits). So the question becomes with all these bits (See FIG. 1) how can you indicate them all somehow through the PBCH or the mechanism around PBCH. It may be a mechanism around being DMRS going with PBCH, it could be scrambling go with PBCH, or any other related resource. With regard to all the bits associated with timing, it is further disclosed herein, how many bits can be transmitted and in what way.

With reference to interleaver design for polar codes, disclosed herein is a construction for polar codes that may work for various payload sizes and for DL, UL, or PBCH.

In view of the issues disclosed above and herein, the below disclosure may address timing indication through PBCH design and polar code interleaver design, among other things.

In summary, the subject matter with regard to timing indication through PBCH design may include the following: 1) Sequences for DMRS timing indication; 2) Timing indication through Scrambling sequences, especially for half frame indication and LSB of SFN; 3) Time specific cover sequence and phase rotation for intra-slot timing indication; 4) Half frame timing indication through time-specific RE mapping; 5) Encoding timing bits in the polar code payload without Cyclic Redundancy Check (CRC); 6) Transmission chain including rate matching, interleaving, and scrambling for PBCH; or 7) Mapping timing bits (e.g., the most critical) to high reliability locations in the polar code payload. With regard to sequences for DMRS timing indication, the sequence designs may allow for: Cell-ID and timing based DMRS sequence; PBCH detection independent of the DMRS sequence; or Differential estimation of channel coefficient.

In summary, the subject matter with regard to polar code interleaver design may include the following: 1) A trapezoid interleaver which may apply to the polar codes in 3GPP NR; or 2) Interleaving pattern-based timing identification for PBCH timing.

Also disclosed herein are mechanisms to indicate half frame timing though DMRS sequence initialization, DMRS mapping order, or DMRS RE location. Techniques that may be considered low complexity may indicate the half frame timing bit with low latency to enable measurements of neighboring cells, preferably without requiring to decode the PBCH.

In addition, disclosed herein are scrambling code designs for a 2-stage scrambling mechanism for the PBCH in NR. A detailed design of scrambling codes enables SS block identification and SFN detection. PBCH DMRS design, half frame timing indication, or scrambling for PBCH may be considered in view of timing indication through PBCH design as disclosed herein.

Further disclosed herein are mechanisms for rate matching and interleaving of PBCH payload and for mapping the PBCH payload to the polar code input sequence. Polar code for PBCH disclosed herein may be considered in view of soft-combining of PBCH as disclosed herein.

Timing information indication though DMRS—disclosed below are design solutions for DMRS for the SS block. In NR, for example, the DMRS may indicate 2 or 3 bits of timing information. These timing bits may be the following. If we denote the timing index of SS blocks by b, where b=0, 1, . . . 63 for SCS>120 KHz. For SCS of 15, 30 KHz, 2 to 3 bits are sufficient. DMRS may indicate the LSB bits (2 or 3) of b—denote this LSB indicated through the DMRS as b'. Note that b'=mod(b, 8) for 3 bits and b'=mod(b, 4) for 2 bits. At a first step, the gNB may transmit the SSBs in burst within 5 ms. At a second step, subsequent to the first step, the UE may acquire the PSS and SSS but it also needs to determine the frame boundary (e.g., the frame timing to process the RMSI and perform other UL and DL communication). The LSB bits denoting the frame timing may be carried on the DMRS of the PBCH. The UE may blindly detect the PBCH DMRS based on the following: 1) it may correlate the potential DMRS candidates (e.g., each DMRS candidate may correspond to one hypothesis of LSB bits) with the received DMRS; and 2) it may select the DMRS candidate with the highest correlation metric or a DMRS candidate with metric exceeding a predetermined threshold as the detected DMRS. At a third step, the UE may determine the timing from the selected DMRS candidate and also performs channel estimation from the DMRS to further decode the PBCH. The LSBs assigned to PBCH DMRS enables to have a unified design for frequency range one (FR1) and FR2. FR1 requires at most 3 bits of timing indication while FR2 requires up to 6 bits of timing indication. For example, FR1 is below 6 GHz and FR2 is above 6 GHz.

Figure 3:
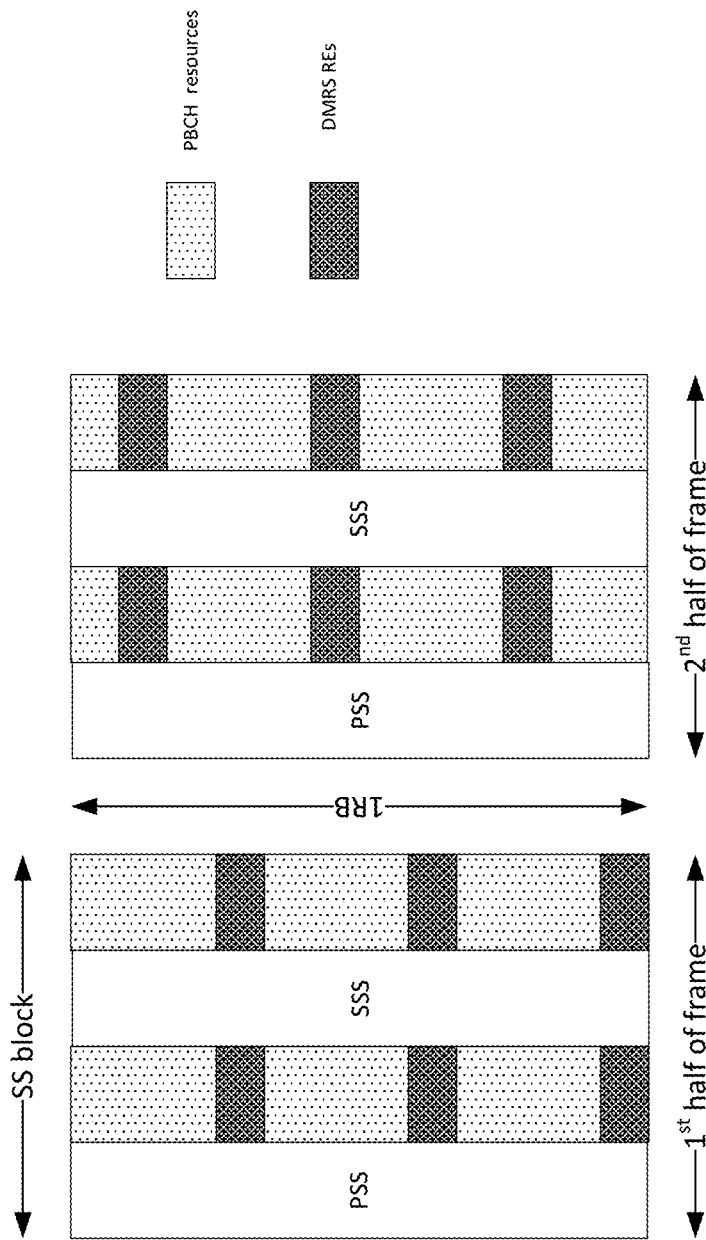
FIG. 3 illustrates an exemplary Half frame indication using the position of the DMRS in the PBCH PRB.

The DMRS may indicate 1 bit of half frame boundary and 1 or 2 LSBs bits of the SFN. For example, the half frame may be indicated by the position of the DMRS within a PRB as shown in FIG. 3. The sequences may indicate the remaining bits. The DMRS may indicate the SS block position within a slot (1 bit for low frequencies and 2 bits for SCS=240 Khz). Disclosed are various design configurations for the DMRS.

Figure 4:
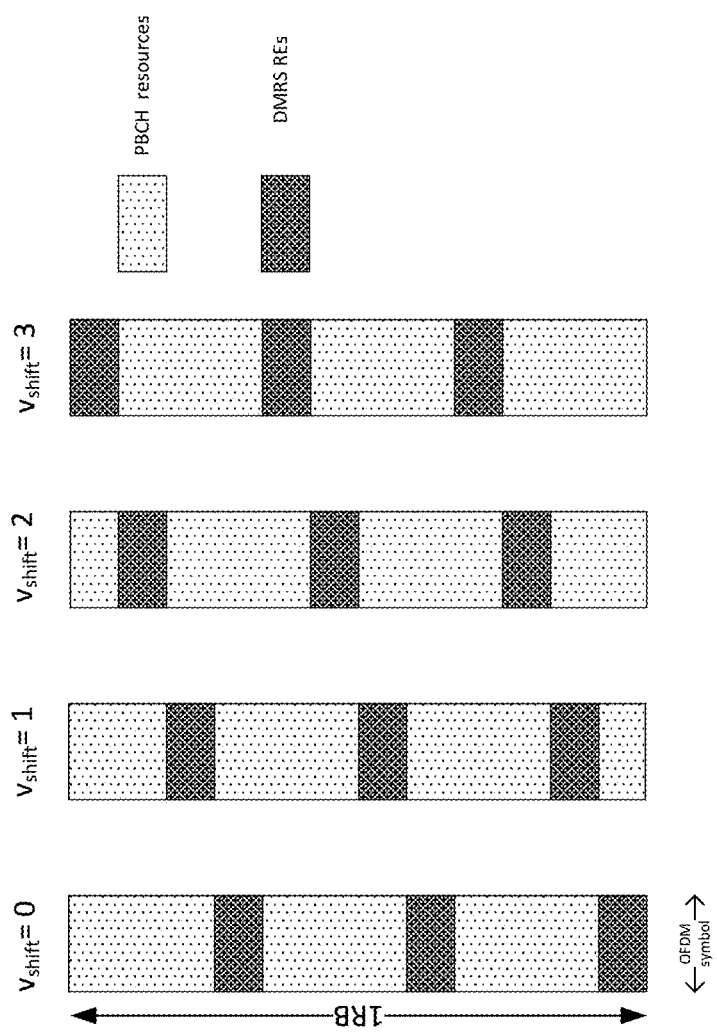
FIG. 4 illustrates an exemplary DMRS resource as a function of cell ID.

Cell ID dependent DMRS placement—disclosed below the location of the DMRS in an RB be cell ID (denoted as $N_{cell}^{ID}$) dependent using the formula $v_{shift}=N_{cell}^{ID}$ mod 4 where $v_{shift}=0$ may be at the lowest end of an resource block (RB). FIG. 4 shows examples of DMRS placement for different values of $v_{shift}$. There is an alternative where the DMRS position may indicate both cell ID and half frame position. FIG. 3 and FIG. 4 indicates the general operation of a cell and the timing information may ride on top of that. The shift is a way of indicating one bit. Across different cells the DMRS position may be different. The formula $v_{shift}=N_{cell}^{ID}$ mod 4 where $v_{shift}=0$ indicates that there may be four unique positions with a RB for the DMRS.

Figure 5:
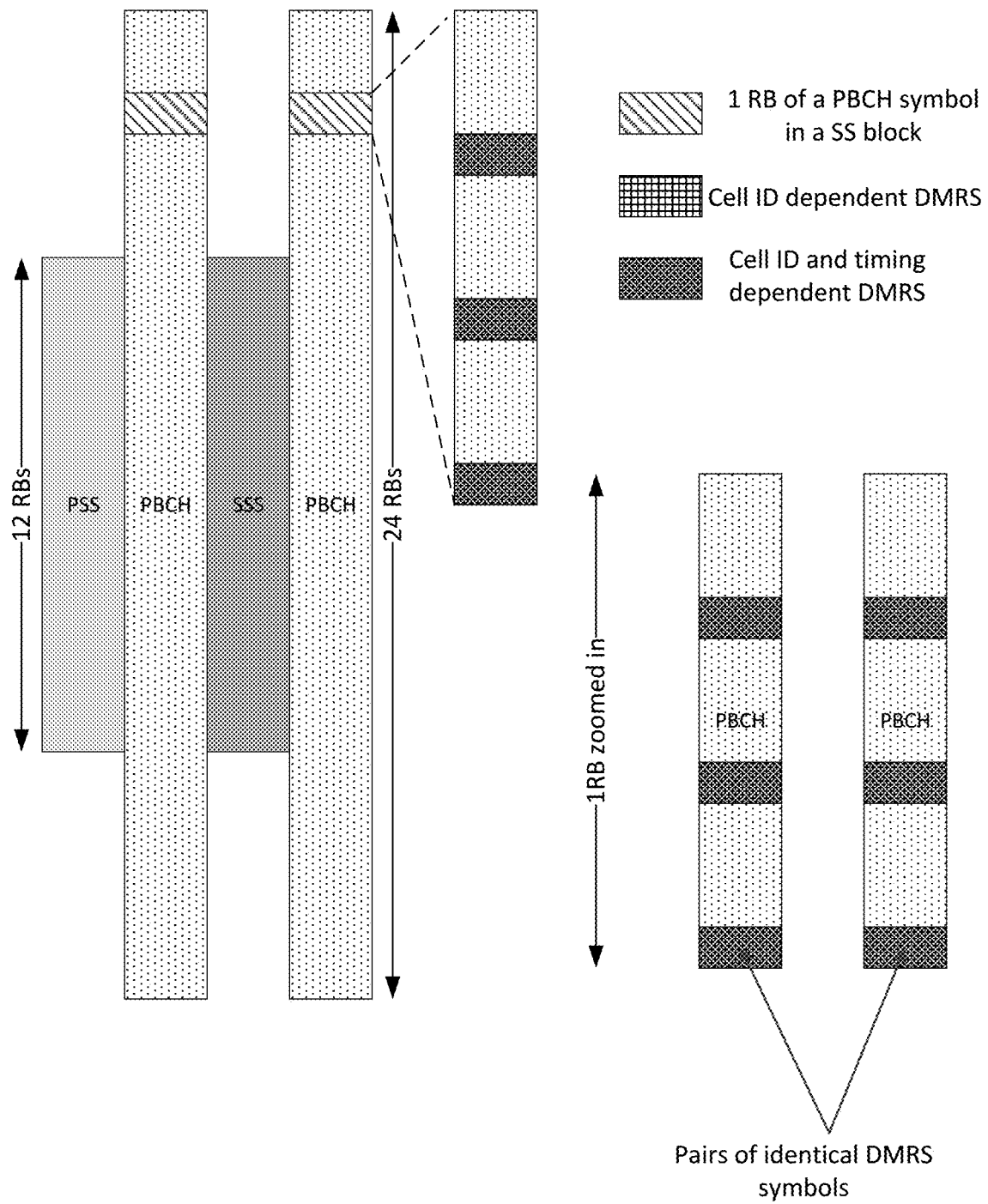
FIG. 5 illustrates an exemplary DMRS sequence based on cell ID and timing.

DMRS resources in PBCH carry timing information is disclosed below. The DMRS may be a function of cell ID $N_{cell}^{ID}$ and the timing bits b'which may correspond to the options for indicated bits listed with regard to timing information indication though DMRS disclosed above. DMRS may be cell ID dependent. And one of those ways may be location. In Equation 1, it can be observed that C is defined in Equation 1 to be a function of cell ID and the b', wherein b' is a certain number of bits. FIG. 5 provides an illustration of the signals in the SS block for $v_{shift}=0$. A length-72 QPSK sequence $r_{SS}^{i}(m)$ is mapped to the DMRS locations of each PBCH symbol.

$$r_{SS}^{i}(m, c_{init,i}) = \frac{1}{\sqrt{2}}(1 - 2 \cdot c(2m)) + j\frac{1}{\sqrt{2}}(1 - 2 \cdot c(2m+1)),$$
$$m = 0, 1, \ldots 71$$

Equation 1 where i=0, 1 and indicates the leading and lagging symbol locations respectively. Here the sequence c(m) is defined in LTE and the pseudo random generator is initialized with $c_{init,i}$ which is a function of $N_{cell}^{ID}$ and b'. An example of how the sequence may be constructed is as follows: $c_{init,0}=2^{12} \cdot N_{cell}^{ID}+512 \cdot b'$ for b' representing 3 bits. The receiver may blindly decode the DMRS from both PBCH symbols together for all possible sequences relating to b' (8 sequences for 3 bits) and may select the sequence with the highest correlation as the most suitable candidate.

Another construction may be based on the above sequence design, but with reduced need for blind decoding. The length-72 QPSK sequence $r_{SS}^{1}(m)$ mapped to the lagging PBCH symbol is obtained through the following relation. The sequence $r_{SS}^{c}(m)$ $$r_{SS}^{1}(m)=r_{SS}^{0}(m, c_{init,1}) \cdot e^{j\theta_{SS}(m)},$$

Equation 2 where $\theta_{SS}(m)$ is a function of $N_{cell}^{ID}$ but not the timing b' and is given below.

$$\theta_{SS}(m)=\arg r_{SS}^{0}(m, c_{init}),$$

Equation 3 where $c_{init,1}=2^{12} \cdot N_{cell}^{ID}$

Because the relation between the sequences is known, channel estimation and frequency estimation may be performed through differential detection between the sequences of the two PBCH symbols without explicit knowledge of the sequences (or the timing b').

Part of the DMRS does not carry timing information as discussed in more detail herein. Some design configurations may help to reduce the number of blind decodes on the DMRS sequences. Here some solutions are disclosed based on the principle that a part of the DMRS is only $N_{cell}^{ID}$ dependent and may be demodulated after primary synchronization signal (PSS) and secondary synchronization signals (SSS) detection without depending on the timing information. Using this channel estimation, the remaining DMRS which carries b' may be decoded, thereby avoiding multiple blind decodes that are used with regard to Cell ID dependent DMRS placement that is disclosed above. The design also allows the PBCH to be decoded without requiring knowledge of the SS block timing.

Figure 6:
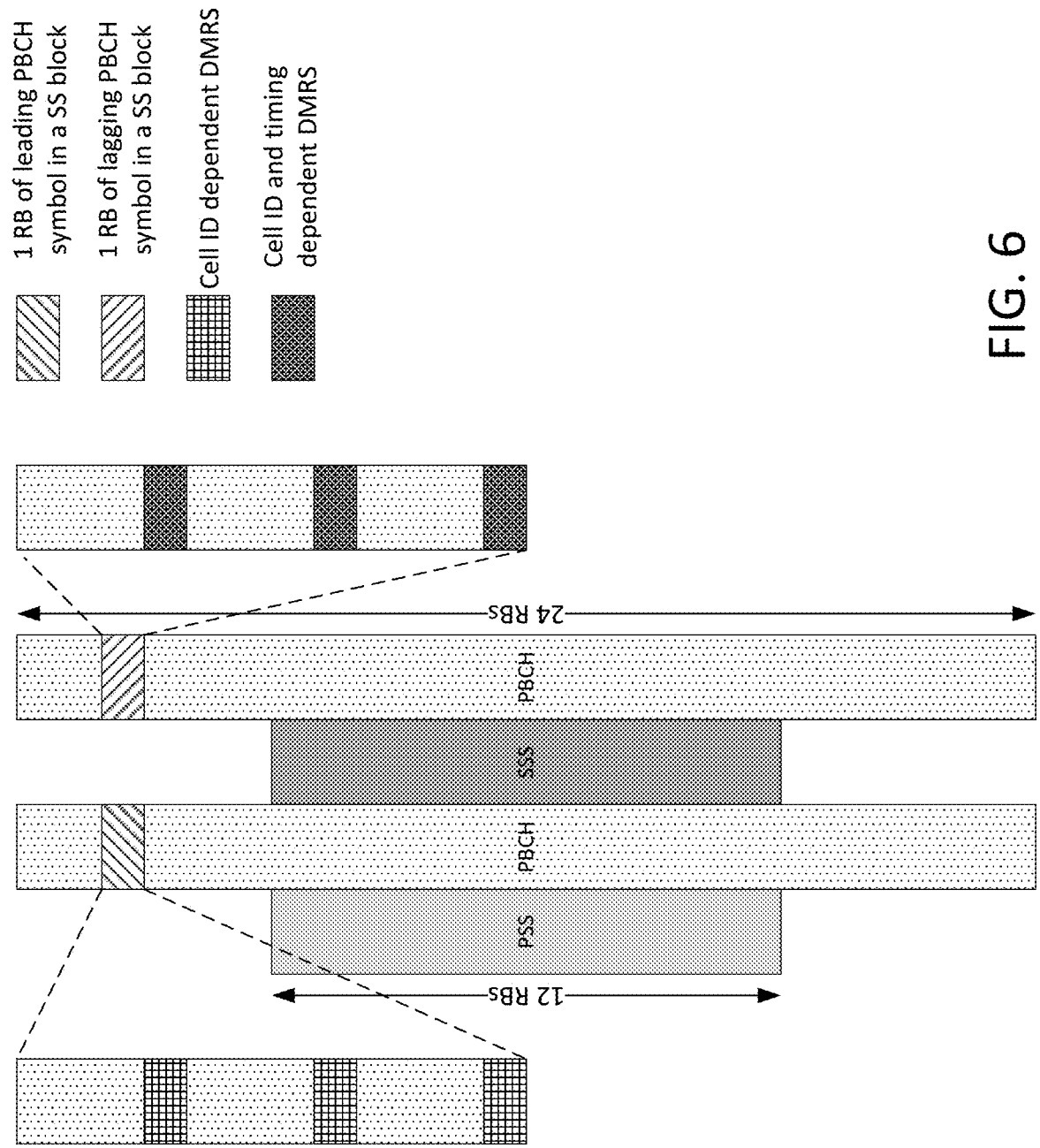
FIG. 6 illustrates an exemplary Cell ID based DMRS sequence in leading PBCH symbol and timing based DMRS sequence in lagging PBCH symbol.

For additional perspective, the part does not carry timing information may be used with high confidence to detect the channel. Because, if the timing information is not known, blind decoding needs to be done and then the channel estimation. But if there is little reliance on what is not known, which is the timing, then DMRS RBs are fixed and therefore channel estimation is done, so overall quality of detection may be higher. As shown in FIG. 6, the first PBCH symbol the RB carries Cell ID dependent DMRS and the second PBCH symbol the RB carries cell ID and timing dependent DMRS.

As shown in FIG. 6, the DMRS sequence used in the leading PBCH symbol is a function of cell ID while the DMRS sequence used in the lagging PBCH symbol is a function of both the cell ID and SS block timing. The DMRS of the leading symbol provides channel estimation for PBCH. The DMRS of the lagging PBCH symbol may also be decoded for the timing information using the channel estimation from the previous PBCH symbol's DMRS. For example, the sequences may be given as follows.

$$r_{SS}^{0}(m, c_{init,0}) = \frac{1}{\sqrt{2}}(1 - 2 \cdot c(2m)) + j\frac{1}{\sqrt{2}}(1 - 2 \cdot c(2m+1)),$$
$$m = 0, 1, \ldots 71$$

Equation 4

$$r_{SS}^{1}(m, c_{init,1}) = \frac{1}{\sqrt{2}}(1 - 2 \cdot c(2m)) + j\frac{1}{\sqrt{2}}(1 - 2 \cdot c(2m+1)),$$
$$m = 0, 1, \ldots 71,$$

Equation 5 here $c_{init,0}=2^{12} \cdot N_{cell}^{ID}$ and $c_{init,1}=2^{12} \cdot N_{cell}^{ID}+512 \cdot b'$.

Figure 7:
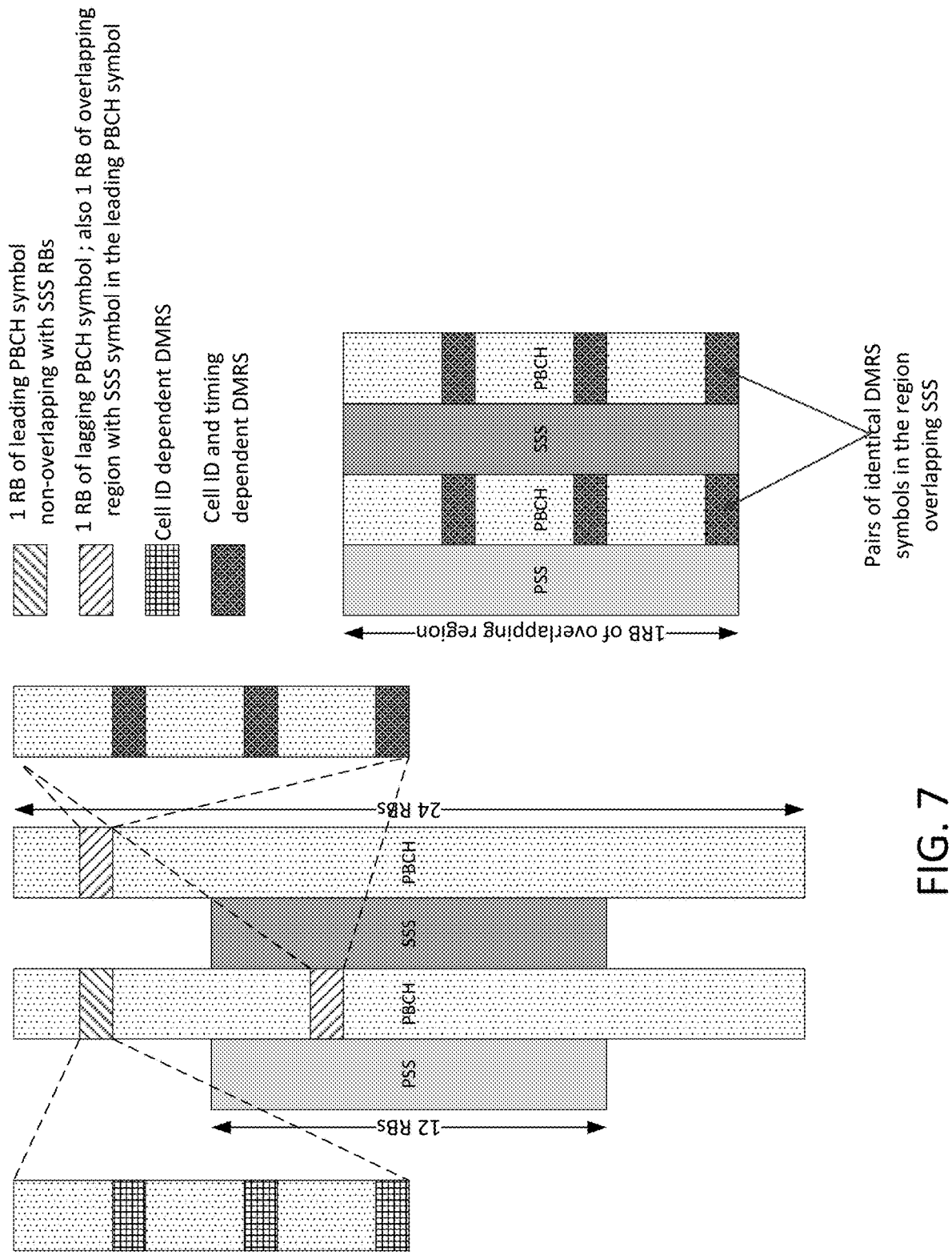
FIG. 7 illustrates an exemplary Cell ID based DMRS sequence in overlapping part of leading PBCH symbol and timing based DMRS sequence in remaining resources.

Another scheme is shown in FIG. 7. Here the cell ID-only DMRS sequence is mapped only on regions of leading PBCH symbol that are non-overlapping with the SSS symbol. The DMRS sequence used in the overlapping regions of the leading PBCH symbol and all RBs of the lagging PBCH symbol carry the timing information in addition to the cell ID. Here, the SSS symbol provides channel estimation for the overlapping region and the DMRS in the non-overlapping region of leading PBCH symbol provides the channel estimation for PBCH. Again, the time-dependent DMRS may also be decoded using this channel estimation.

Furthermore, as shown in the FIG. 7, the DMRS sequences in the region overlapping with SSS may be related through a $N_{cell}^{ID}$ based sequence as disclosed with regard to Cell ID dependent DMRS placement, Equation 2, and Equation 3. Differential detection may be used to aid in channel estimation of PBCH and frequent offset correction.

Timing information through scrambling sequence—Since b' indicates 2 or 3 bits of SS block timing, all or some of the additional bits (4 or 3 bits respectively) may be indicated by the scrambling sequence used to scramble the PBCH sequences. Alternatively, scrambling sequences for PBCH may indicate 3 to 4 bit of some LSBs of SFN and half frame boundary.

A scrambling sequence may be applied to the encoded PBCH sequence, the scrambling being a function of the cell ID $N_{cell}^{ID}$. Additionally, the scrambling may also depend on the SS block timing b'.

The following scrambling operation may be used for the PBCH. If PBCH is mapped to two 5 ms in a frame, h=1, else h=0. Let b' denote the LSBs of the SFN number represented through scrambling. The $b^{SFN}$ corresponds to 1 or 2 or 3 bits. Note that the construction may also detect the half frame boundary if each 5 ms carries the SS blocks. So scrambling may detect $b^{SFN}+1$ bits.

$$s(i)=(e(i)+c(i)) \bmod 2 \qquad \text{Equation 6}$$

Here e(i) is the rate matched PBCH bits being scrambled, c(i) is defined in LTE, with the initial scrambler state set to $c_{init}$ which may be configured in the following ways:

$c_{init}=N_{cell}^{ID}$ (latency is small as PBCH may be decoded before determining b')

$c_{init}=2^3 \cdot N_{cell}^{ID}+b'$ if b' corresponds to 3 bits. (latency is higher as b' is known prior to decoding PBCH but may be more robust to interference)

Figure 8A:
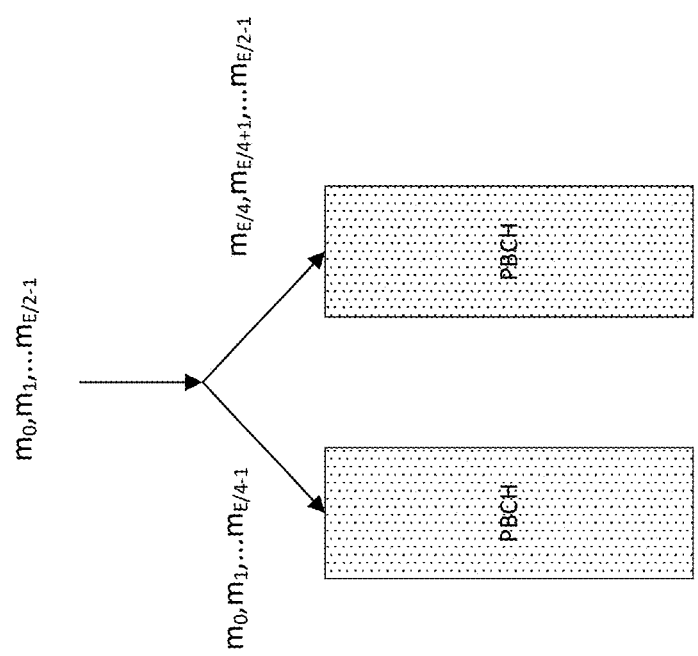
FIG. 8A illustrates an exemplary indication of location within a slot—Mapping PBCH symbols to the SS block
Figure 8B:
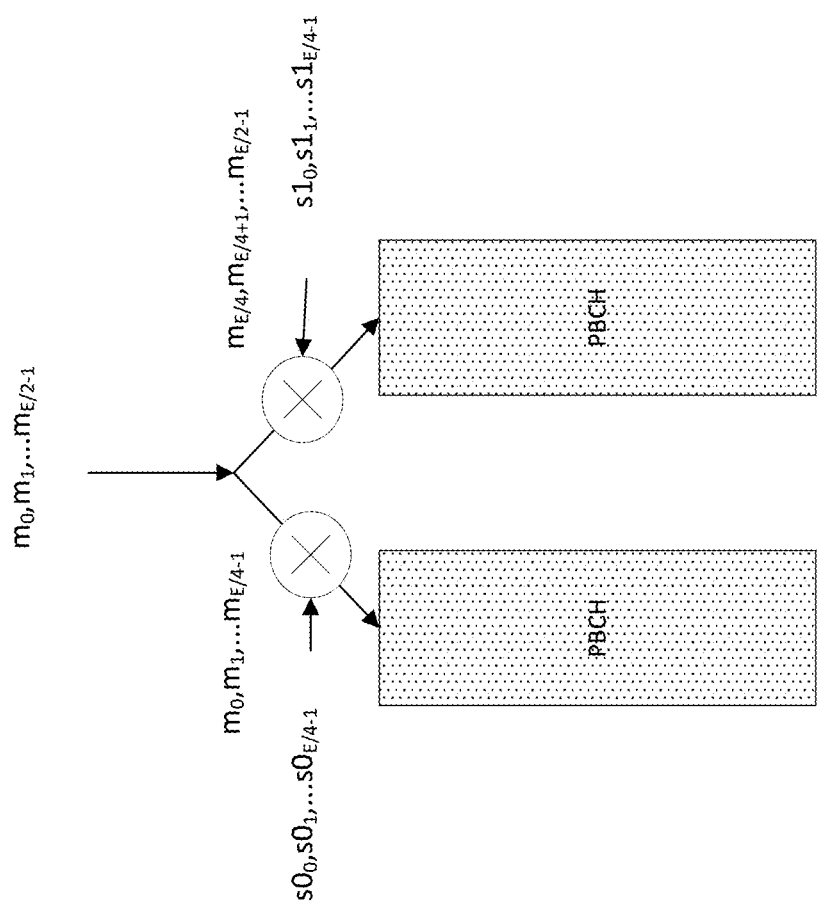
FIG. 8B illustrates an exemplary indication of location within a slot—cover sequences for the PBCH OFDM symbols.
Figure 8C:
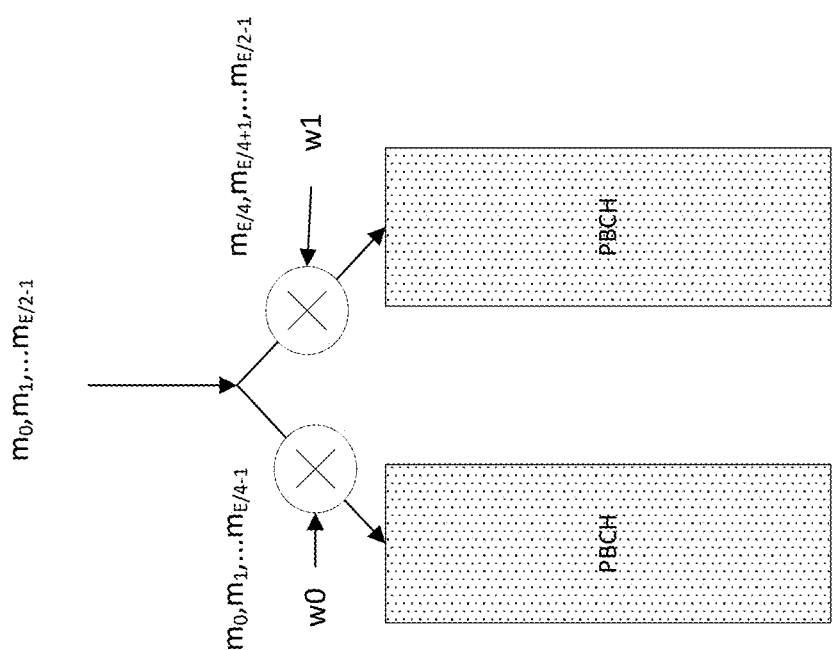
FIG. 8C illustrates an exemplary indication of location within a slot—Scalar phase rotation applied to PBCH.
Figure 8D:
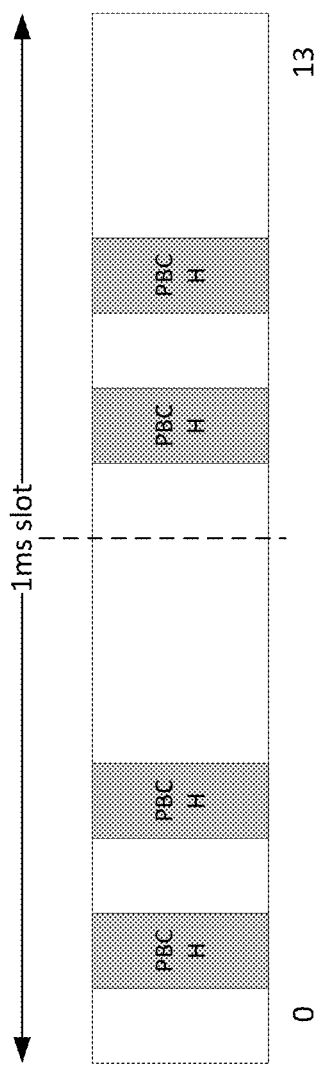
FIG. 8D illustrates an exemplary indication of location within a slot—Possible location of SS blocks in a 14 symbol slot.
Figure 9:
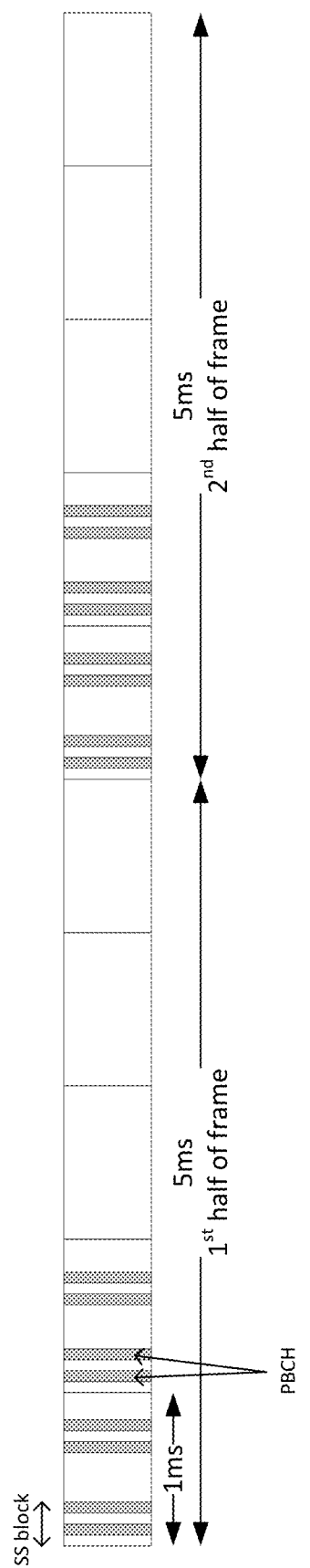
FIG. 9 illustrates an exemplary Half frame location of SS bursts.

Timing indication within a slot—FIG. 8D shows an example of 15 KHz deployment with at least two possible SS block locations within a 14 symbol slot. FIG. 8A shows how the modulated symbols may be mapped to the 2 symbols within a SS block—the incoming modulated symbols are split in two segments and mapped to the two OFDM symbols. This intra slot timing information may be implicitly coded into this mapping in one of the following ways. In a first way, cell specific covering sequences s0 and s1 may be applied to the 2 PBCH symbols within an SS block as shown in FIG. 8B. Here the s0 and s1 are function of the timing bits. In a second way SS block specific phase rotation may be applied to PBCH symbols as shown in FIG. 8C. The scalar weights w0 and w1 may provide 1 or 2 bits of information. For example, different solutions are given in Table 1, Table 2, and Table 3 for 1 or 2 bit information capacity.

TABLE 1

Scalar phase rotation indicating 1 bit of timing

| w0 | w1 |
|----|----|
| 1  | 1  |
| 1  | -1 |

TABLE 2

Scalar phase rotation indicating 2 bits of timing

| w0 | w1 |
|----|----|
| 1  | 1  |
| 1  | j  |
| 1  | -1 |
| 1  | -j |

TABLE 3

Scalar phase rotation indicating 2 bits of timing

| w0 | w1 |
|----|----|
| 1  | 1  |
| 1  | -1 |
| j  | j  |
| j  | -j |

Both covering code and scalar weights may be applied to the PBCH symbols for more robustness.

Figure 10A:
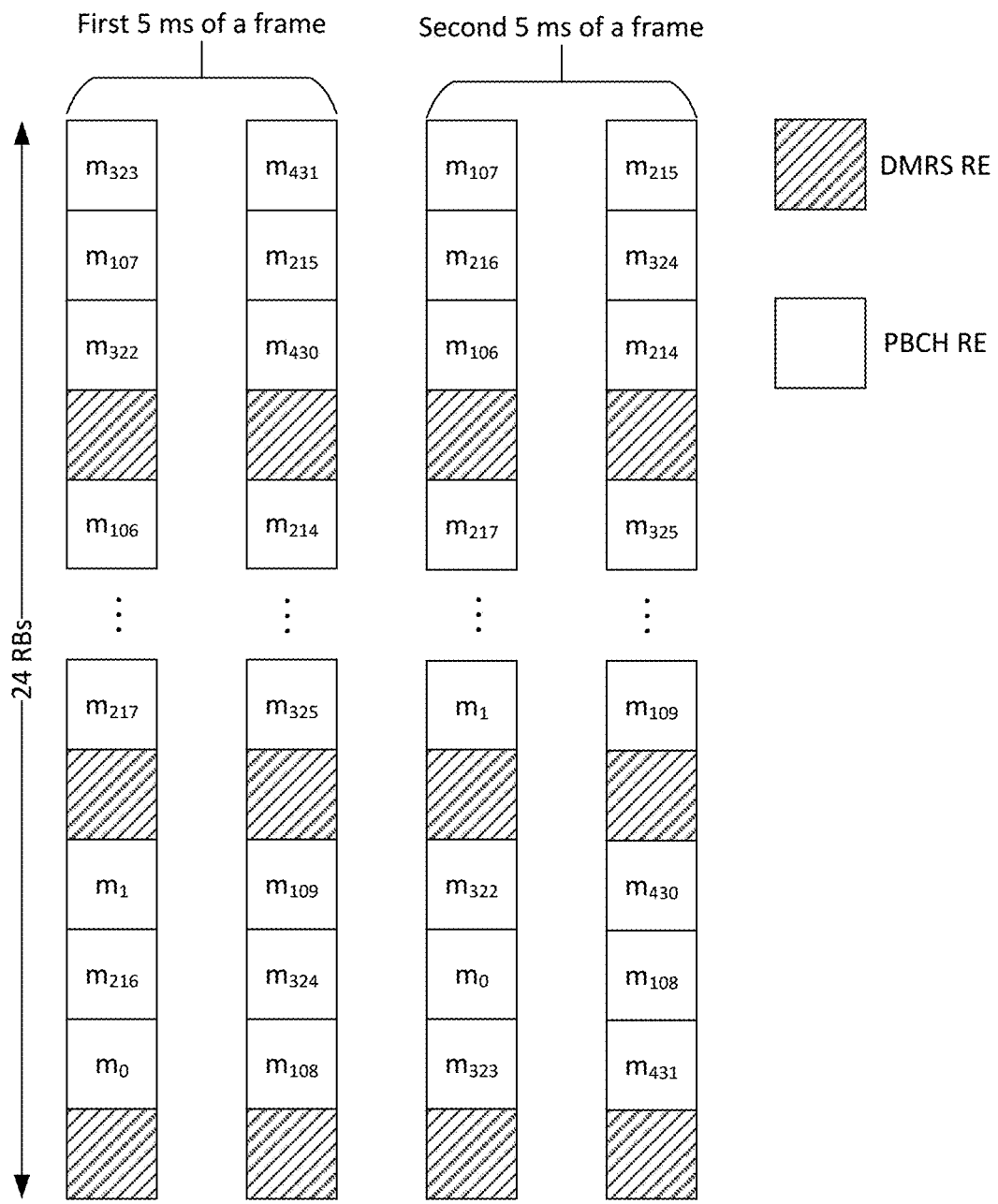
FIG. 10A illustrates an exemplary Differentiating 1st and 2nd halves of a frame—Different RE mappings of PBCH symbols.
Figure 10B:
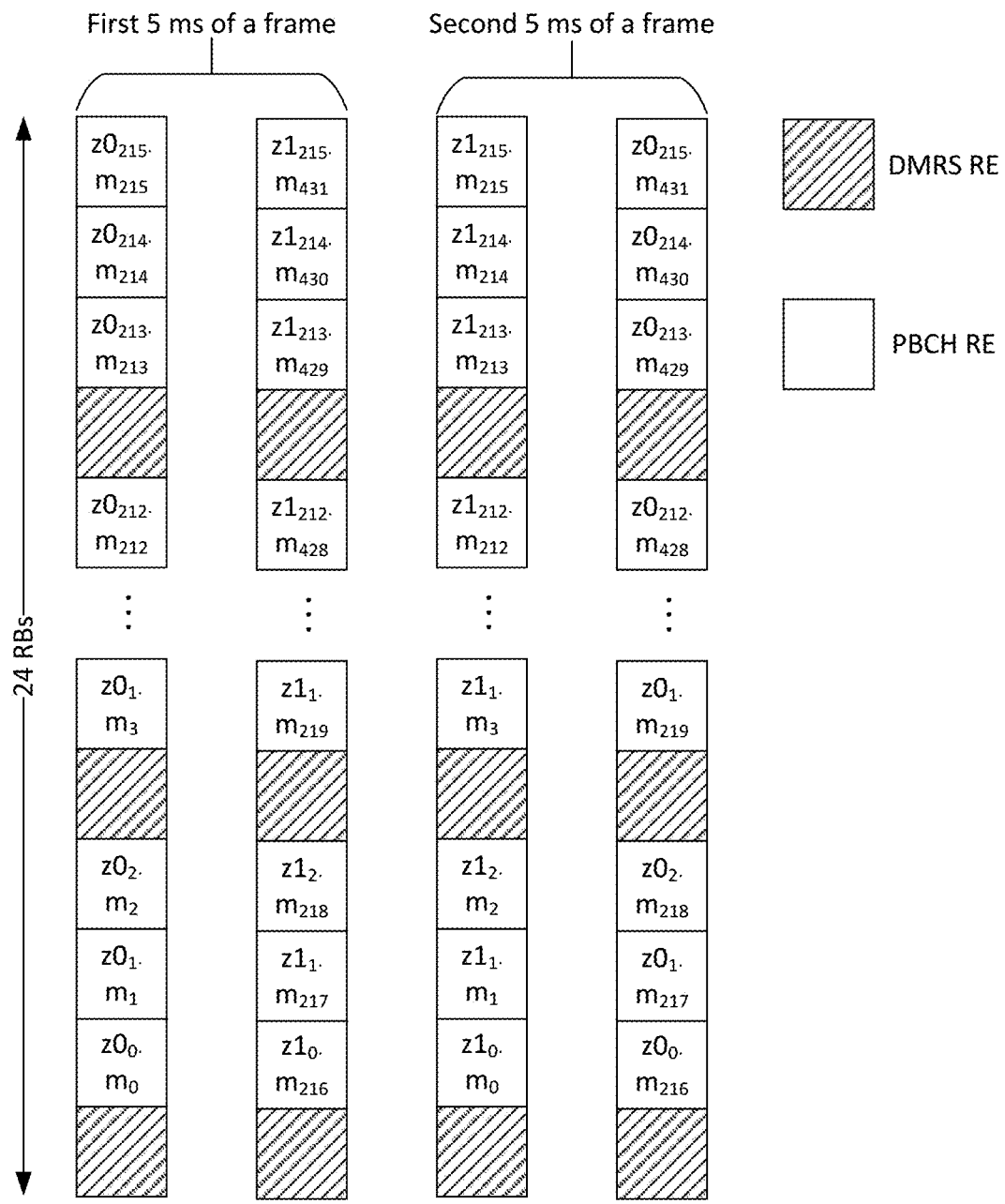
FIG. 10B illustrates an exemplary Differentiating 1st and 2nd halves of a frame—Covering sequences are applied to the PBCH symbols.

Other techniques for Half frame timing indication—The SS bursts may occur in the $1^{st}$ or $2^{nd}$ half or both halves of a frame (depending on the periodicity). So, there is an indication of the 5 ms part within the frame. The indication of half frame boundary may be provided in one of the following ways. In a first way, PBCH sequences may be mapped differently in the first and second half of the frame. For example, the modulated PBCH symbols $m_0, m_1, \ldots, m_{E/2}$ may be mapped as shown in FIG. 10A. Here E=864, the mapping is done by splitting the E/2 symbols into 2 segments and mapping the symbols to alternate resource elements (REs). In a second way, PBCH sequences may have different covering sequences in the first and second half of the frame. Cell specific covering sequences z0 and z1 are to the PBCH symbols as shown in FIG. 10B. Here sequences z0 and z1 may be functions of $N_{cell}^{ID}$ or b'. For example, they may be BPSK sequences given below.

$$z0(m, c_{init})=(1-2 \ldots c(m)) \qquad \text{Equation 7}$$

where m=0, 1, ... E/4, $c_{init}=2^{12} \ldots N_{cell}+b'$ $$z1(m, c_{init})=(1-2 \ldots c(m)) \qquad \text{Equation 8}$$

where m=0, 1, ... E/4, $c_{init}=2^6(2^{12} \cdots N_{cell}^{ID}+b')$

Figure 10C:
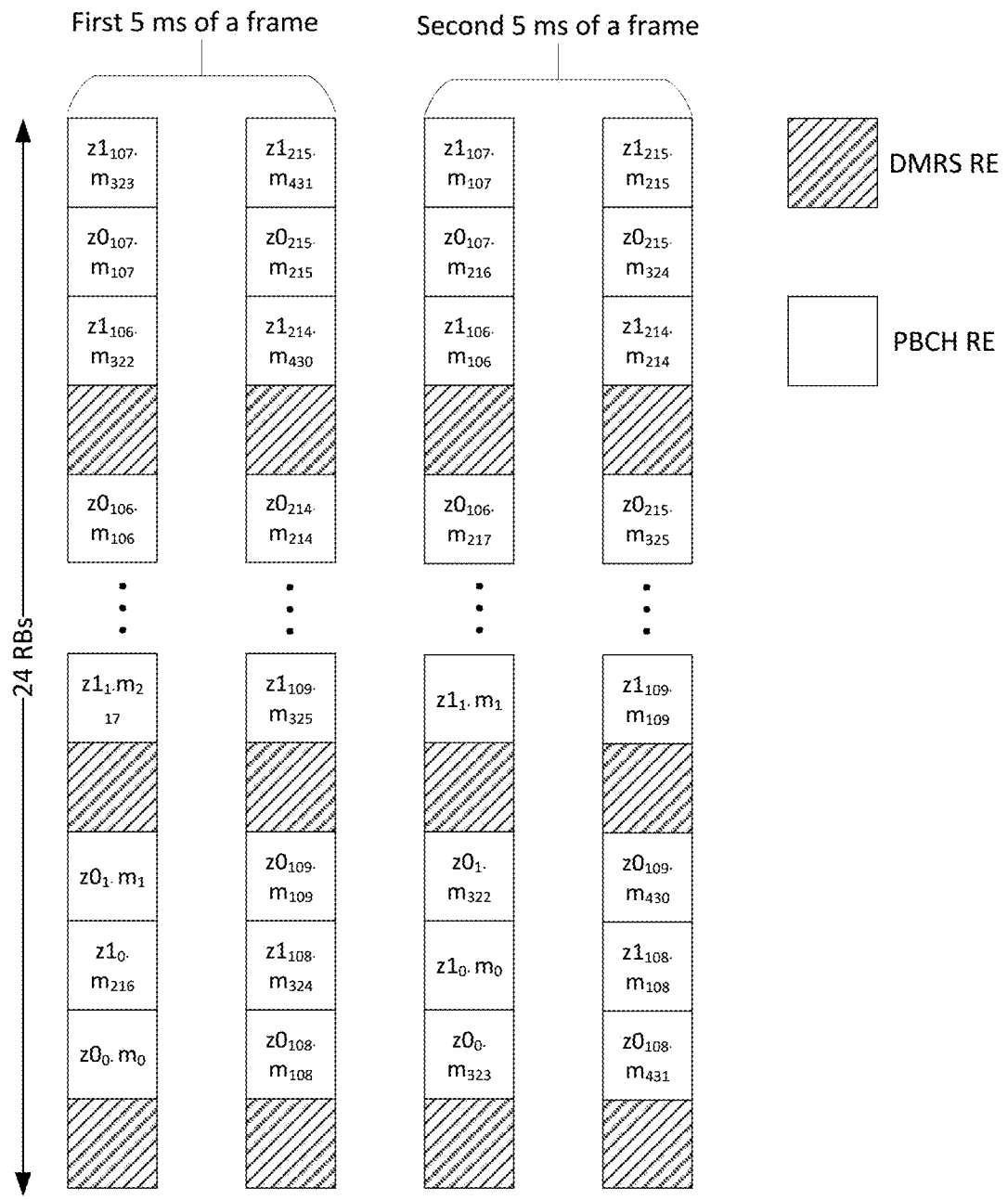
FIG. 10C illustrates an exemplary Differentiating 1st and 2nd halves of a frame—Both RE mapping and covering sequences are applied to the PBCH symbols.

In a third way, both RE mapping and covering sequences z0 and z1 may be used as shown in FIG. 10C.

Even if the mechanisms of FIG. 10 were implemented there still may be remaining timing information. Several bits of timing info may be unknown to the UE. The DMRS may provide a few bits but remaining bits have to be indicated in other ways. Remaining timing information may be carried in the PBCH payload encoded with the polar code. For the lower SCS, such as 15 and 30 KHz, the DMRS may be sufficient to indicate the slot timing within the 0.5 ms period carrying the SS burst by providing 3 bits of information. For 120 and 240 KHz cases, 6 bits are required to represent the possible slot timings—up to 3 more bits are required. This additional timing information (which may be slot timing) may have to be explicitly included in PBCH payload as b". In this case, while the MIB may be the same across the SS blocks within the PBCH TTI, the timing bits between the SS blocks corresponding to different timings may be different—effectively the payload may be different between different SS blocks. To allow PBCH from different SS blocks with a PBCH TTI to be combined for higher SNR and lower latency the following is disclosed with reference to FIG. 11. Note the information in FIG. 11 or the like is an example of the payload that is transmitted on PBCH through methods described by FIG. 12, FIG. 13, FIG. 17, or FIG. 18.

Figure 11:
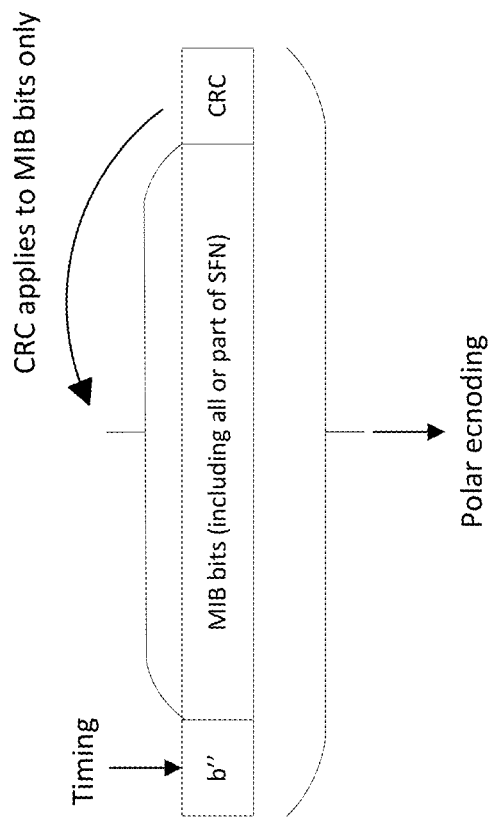
FIG. 11 illustrates an exemplary carrying of some SS block indication bits in PBCH payload.

The CRC may be computed only on the bits that are unchanged between the SS blocks—these may include some or all the SFN bits. This is seen in FIG. 11. The timing may not be encoded as CRC, because there may be a desire to combine the PBCH between different beams. And each beam would carry its own b", because b" may be unique to each beam. It is preferable to combine the different PBCH before you do a joint detection, so that you have a better chance of decoding the PBCH accurately. The UE may form soft estimates of the master information block (MIB) bits (those protected by CRC) from multiple SS blocks within a PBCH TTI (with 5 ms itself) and combine them for SINR gain. After successfully decoding the MIB, the UE may decode the timing for any one of the SS blocks. In addition, the timing indication may increase incrementally for the SS blocks, e.g., SS block in slot #0 of frame carries b=000000, the next SS block which may be in slot #1 carries b=000001 and so on. The UE may use the time difference $b_i - b_j$ (bit difference) between the SS blocks i and j for soft-combining to aid the decoder.

In this scenario, the bits of b" affect the polar encoder's output just as a scrambler would. Effectively, this may be thought of as a way to apply a scrambler which is a function of b".

PBCH transmission chain—The channel interleaver for Polar coded PBCH may occur prior to rate matching or after rate matching. Rate matching is done using repetition using a circular buffer similar to that in LTE as the PBCH TTI is much larger than the encoded payload. The following solutions are provided for the interleaver and rate matching operation given that a PBCH TTI is significantly larger than the DCI and UCI being considered for polar code design, but has to be self-decodable within each SS block.

We introduce the following notation as shown in Table 4. Note that $C = T/(H \cdot L)$.

TABLE 4

T - Number of bits within a PBCH TTI
H - Number of half frames carrying SS blocks within the PBCH TTI
L - Number of SS blocks within 0.5 ms
C - Polar coded PBCH payload prior to rate matching It is understood that the entities performing the steps illustrated herein, such as FIG. 12-FIG. 13B and FIG. 17A-FIG. 18B, may be logical entities. The steps may be stored in a memory of, and executing on a processor of, a device, server, or computer system such as those illustrated in FIG. ZZB or FIG. ZZF. Skipping steps, combining steps, or adding steps between exemplary methods disclosed herein (e.g., FIG. 12-FIG. 13B and FIG. 17A-FIG. 18B) is contemplated.

Figure 12:
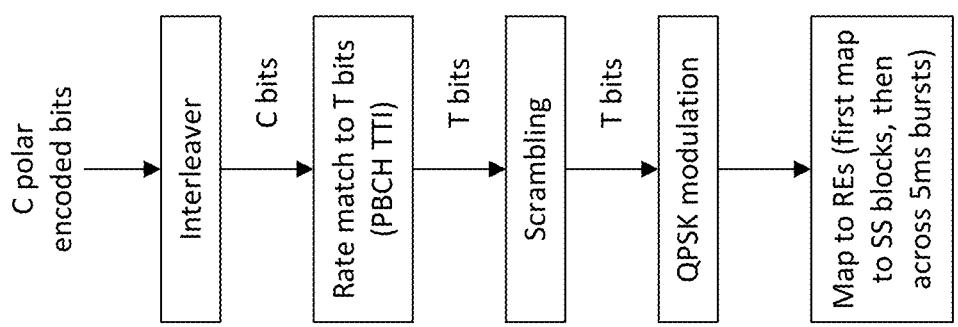
FIG. 12 illustrates an exemplary PBCH transmission using Interleaver prior to rate matching.

In FIG. 12, the interleaver occurs prior to rate matching. The interleaver's output is rate matched to the entire PBCH TTI and a scrambling sequence carrying some SFN bits and possibly half frame indication is applied to it. The shown T bits may be for all SSBs in 5 ms. The bits are QPSK modulated and mapped to the SS blocks in time.

Figure 13A:
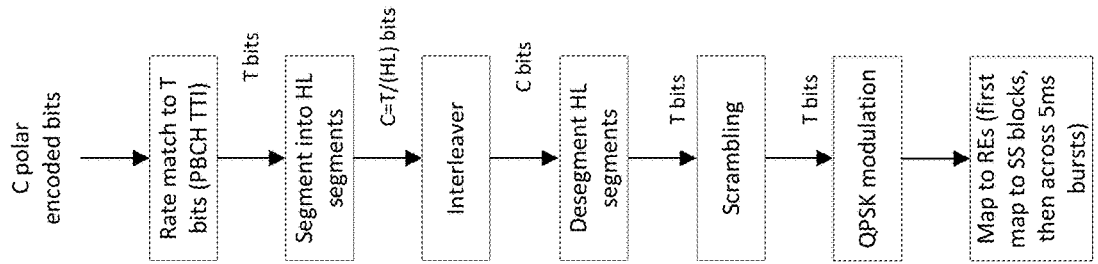
FIG. 13A illustrates an exemplary PBCH TTI generation—PBCH is rate matched for entire TT including the SS blocks.
Figure 13B:
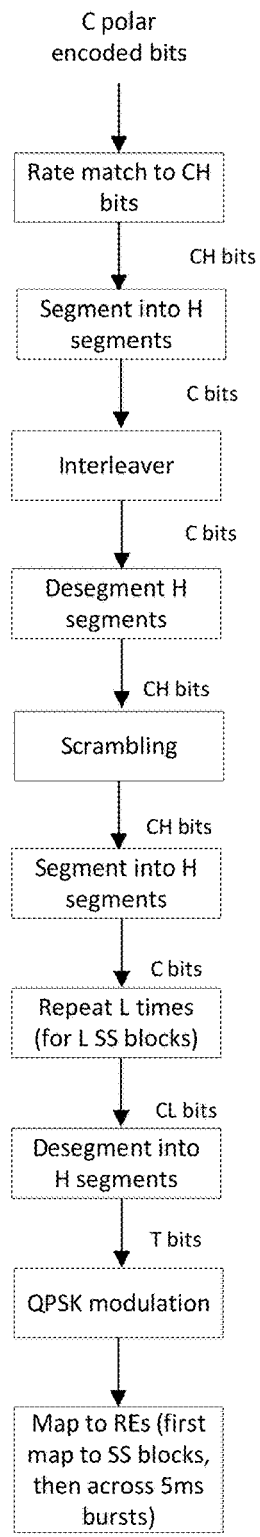
FIG. 13B illustrates an exemplary PBCH TTI generation—PBCH is rate matched for a TTI of single SS block and repeated for all the other SS blocks.

In the schemes shown in FIG. 13A and FIG. 13B, the interleaver occurs after rate matching. The different schemes are further explained below.

In FIG. 13A, the rate matching generates T bits for all the SS blocks occurring within the entire PBCH TTI. This T-length vector is segmented into H·L equal segments, each with T/(H·L) bits. The interleaver is applied to each of these segments. Following this, scrambling carrying some bits of SFN and possibly half frame indication is applied across all the segments. The scrambler may use the sequence c(i) as defined in LTE with $c_{init} = 2^{10} + N_{cell}^{ID}$, initialization occurring at the start of a PBCH TTI. Subsequently modulation and mapping occurs. In this scheme, there is likely to have more coding gain because there is rate matching over the entire SS block.

In FIG. 13B, the rate matching generates only C·H bits (which may be considered as bits of a PBCH TTI for a single SS block). This vector is interleaved every C bits. Post-interleaving C·H bits are scrambled using a length-C·H sequence that may represent a few bits of the SFN and possibly half frame indication. This pattern is repeated L times for each of the SS blocks within the 5 ms period. Note that the scrambling sequence remains the same for every SS block within the 5 ms. Again, the scrambler may use the sequence c(i) as defined in LTE with $c_{init} = 2^{10} + N_{cell}^{ID}$. The initialization occurs at the start of a PBCH TTI. In this scheme it may be simpler to decode in which the number of blind decodes would be fewer. In FIG. 13A there is rate matching across all SS blocks, while in FIG. 13B you take each SS block and there is a rate matching to be able to repeat over a certain periodicity. So for FIG. 13B, if there is an SS block that occurs at 5 ms periodicity, then PBCH TTI may be 40 ms. That means there is up to eight 5 ms durations for the SS block is to be repeated. This same procedure may be repeated for each of the other SS blocks on the other beams. FIG. 13A may have more coding gain because there is a rate matching over its entirety. FIG. 13B may be considered easier to decode, because the number of blind decodes may be fewer. In other words, the number of blind decodes are fewer because there is a repeat for each SS block.

Mapping the payload to polar code sequence—As disclosed with regard to the discussion of the remaining timing information in the payload and FIG. 11, several timing indication bits are carried in the payload of the PBCH. Disclosed are ways to indicate these bits explicitly as part of its payload or implicitly through scrambling, DMRS sequences. For the lower SCS (<120 KHz), the bits $b_3$, $b_4$ and $b_5$ may not carry any information as at most 8 beams are supported. But for SCS of 120 KHz these bits may carry useful information.

NR may encode the bits $b_3$, $b_4$ and $b_5$ as part of the PBCH payload, especially for higher frequencies (as described in the discussion of the remaining timing information in the payload and FIG. 11). The NR may decide to drop these bits for the design of the lower frequencies, e.g., the PBCH payload may not contain $b_3$, $b_4$ and $b_5$. Alternatively, if a unified design with higher frequencies is desired, these bits may be set to known constant such as 0 for the lower SCS. Alternately, they may carry bits tied to the cell ID, example, $b_3$, $b_4$ and $b_5$ are set to $N_{cell}^{ID}$ mod 8.

The timing bits may be mapped to the most reliable locations in the sequence input to the polar code. For high frequency cases, if $b_3$, $b_4$ and $b_5$ are present in the payload, they may be located in the 3 most reliable locations of the sequence, followed by the half frame indication bit (if present) and the bits of the SFN.

For the lower SCS, if $b_3$, $b_4$ and $b_5$ are carried in the payload, they may be mapped to the lowest reliability locations of the code as they may not carry useful information.

Interleaver design for Polar code is discussed in more detail herein. The interleaver may occur before or after rate matching in the transmission chain of the encoded payload.

For a highly randomized interleaving a trapezoid-interleaver may randomize the bits at the right tip of the triangular interleaver as disclosed in the Background above. However, it keeps the gap between the adjacent output indices in a given column different (p, p−1, p−2, . . . ) unlike a rectangular interleaver where the gap is uniform.

Figure 14:
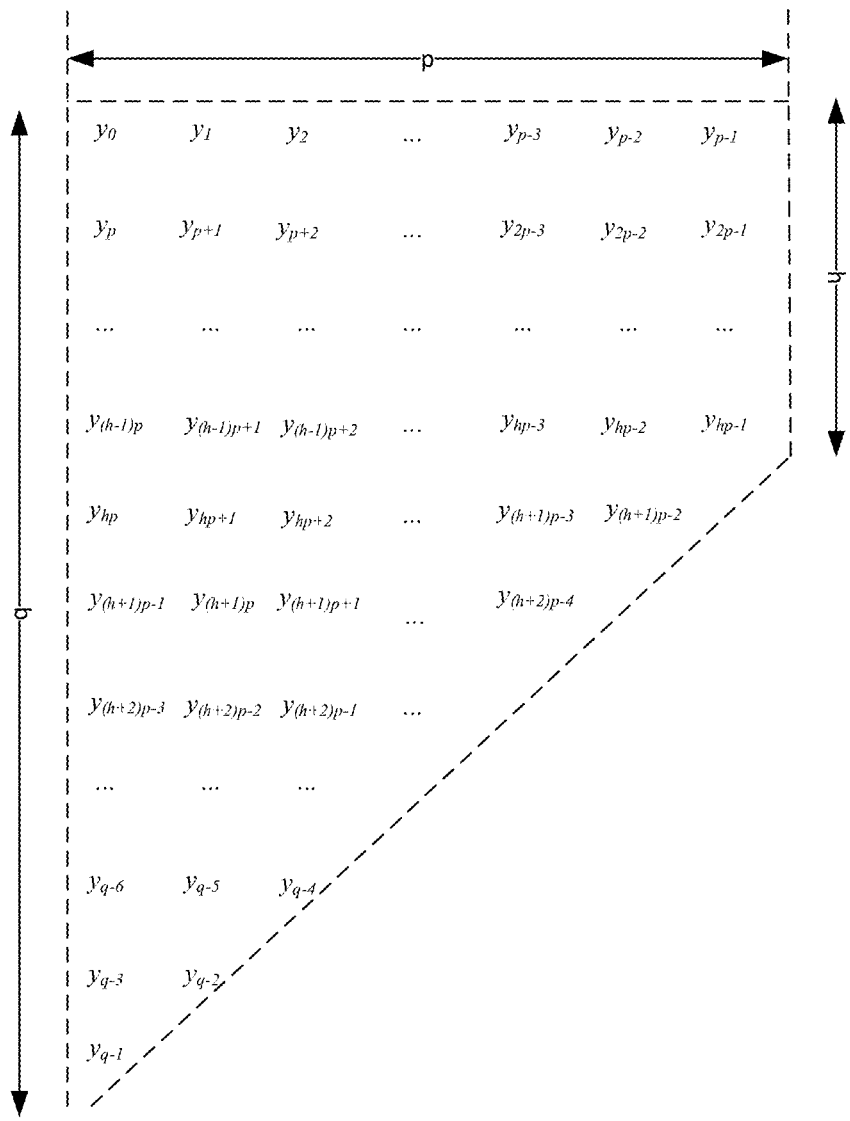
FIG. 14 illustrates an exemplary Trapezoid interleaver with dimensions (q,h,p)

The entries are written row-wise into a trapezoid with dimensions as shown in FIG. 14 and at the output the entries are read out column-wise. The trapezoid has parallel sides of length q and h rows. The base is of length p. If E is the number of bits to be interleaved, and the modulation order is m, then h≥m. For a chosen h, the interleaver may be constructed using the following equation:

$$\text{Find } p \text{ and } q \text{ such that } E < V \text{ where } V = \frac{p(h+q)}{2} \text{ is minimized} \quad \text{Equation 9}$$

p and q are chosen according to a relation such that |p−q| is small while ensuring that V is an integer. For example, the requirement may be q=p+1. For this example case, if h=10 is selected and E=432, then p=25 and q=26.

Timing indication through the interleaver for PBCH—The input to the interleaver may be written into the trapezoid interleaver from different starting locations and on reaching the end of the trapezoid (bottom tip in FIG. 14), returning to the start of the trapezoid and filling the remaining locations. The starting location may be a function of the timing. For example, the PBCH in different SS bursts may use different starting locations, or those in different SS blocks within a burst may use different starting locations. For example, the different starting locations may occur at the start of different rows within the interleaver.

The interleaver may be held in the user equipment (UE) or gNB. For example, if the interleaver is applied to UL control, then it may be within the UE. If the interleaver is applied to the PBCH and DL control then it may be within the gNB. There is a de-interleaver at the receiver end.

For PBCH timing as disclosed herein, the blind decodes may happen at the UE and signaling may happen from the gNB.

Disclosed below is further information with regard to half frame time indication. It is contemplated that the UE should be able to perform beam/cell measurement and identification quickly and reliably with minimal need for measurement gaps. Therefore, if there is considerable delay due to reading the time index from PBCH, this may impact handover performance and UE power consumption. This begs the questions if the time index indication needs to be acquired by the UE for every measurement sample and if the UE also need to acquire the time index indication in the idle/inactive mode? Well, with the aforementioned in mind, half radio timing may be indicated by PBCH-DMRS irrespective of SS burst set periodicity. Therefore, at least one of the following approaches, which are further described below, may be considered for implementation: 1) PBCH-DMRS sequence initialization; PBCH_DMRS frequency shift; or 3) PBCH-DMRS mapping order. A combination of one or more of sequence initialization, mapping order, or RE location (e.g., PBCH_DMRS frequency shift) may be used to indicate the half frame timing.

With reference to DMRS sequence initialization, a length-72 WPSK sequence $r_{SS}^i(m)$ may be mapped to the DMRS locations of each PBCH symbol. It may be expressed as shown in Equation 10. An example, with the initialization $c_{init,i}$ of the sequence is given by Equation 11.

$$r_{SS}^i(m, c_{init,i}) = \frac{1}{\sqrt{2}}(1 - 2 \cdot c(2m)) + j\frac{1}{\sqrt{2}}(1 - 2 \cdot c(2m+1)), \quad \text{Equation 10}$$

$$m = 0, 1, \ldots 71 \text{ and } i = 0, 1,$$

where i indicates the leading and lagging symbol locations, respectively.

$$c_{init,i} = 2^{12} \cdot N_{cell}^{ID} + 512 \cdot b' + \alpha \cdot h, \quad \text{Equation 11:}$$

where b' represents the integer formed by the 3 LSB bits of the SS block index, h is set to 0 for first half of the frame and h is set to 1 for second half of the frame, and α may take values such as α=1 or α=64. It is contemplated herein that $c_{init,i}$ of equation 11 may be used in Equation 10. The $c_{init,i}$ of equation 11 is a function of h, which is different than in Equation 1.

With reference PBCH-DMRS frequency shift, PBCH DMRS RE location (e.g., the $v_{shift}$), could be a function of the half frame bit h. The $v_{shift}$ may change in each half of the frame according to Equation 12.

$$v_{shift} = (N_{cell}^{ID} + h) \bmod 4 \text{ for } h = 0 \text{ or } 1 \quad \text{Equation 12}$$

Figure 15A:
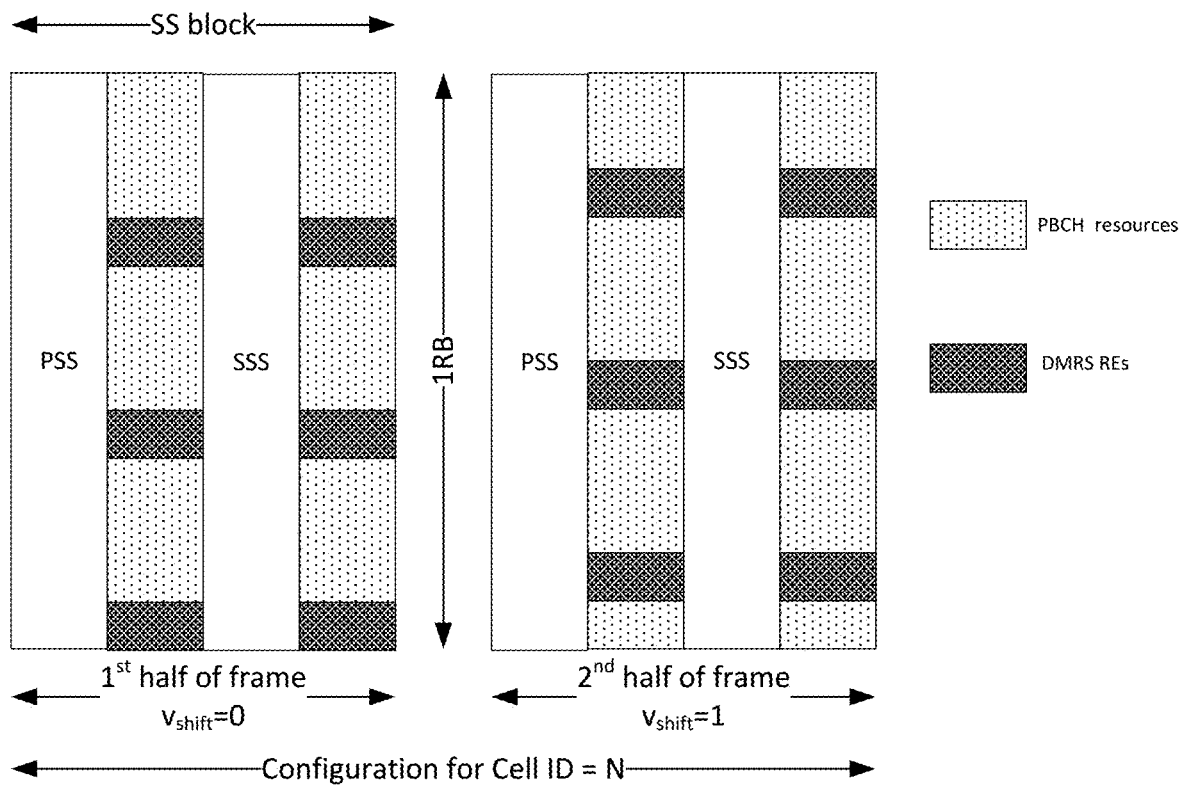
FIG. 15A illustrates an exemplary RE location mapping to reduce inter cell interference for Cell ID N.
Figure 15B:
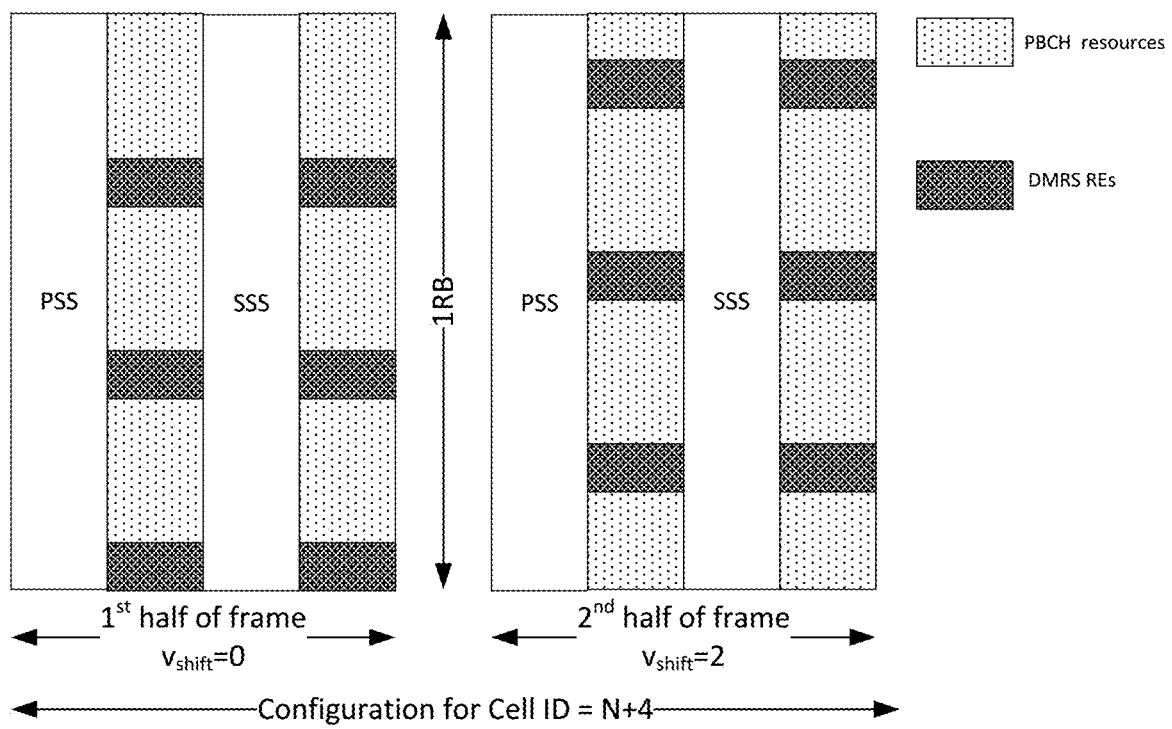
FIG. 15B illustrates an exemplary RE location mapping to reduce inter cell interference for Cell ID N+4.

An example for $v_{shift}$ is given below with regard to Equation 13 (applied to the first half of frame) and Equation 14 (applied to second half of frame) in view of FIG. 15. FIG. 15A illustrates an exemplary RE location mapping to reduce inter cell interference for Cell ID N. FIG. 15B illustrates an exemplary RE location mapping to reduce inter cell interference for Cell ID N+4. The DMRS REs interfere only in one of the SSBs. The $v_{shift}$ may be chosen in a way that two cells that have the same $v_{shift}$ for one of the half frames do not have the same $v_{shift}$ for the other half frame. This may randomize interference when combining estimates across the half frames.

$$v_{shift,0} = N_{cell}^{ID} \bmod 4 \text{ for } h = 0 \quad \text{Equation 13}$$

$$v_{shift,1} = \left(N_{cell}^{ID} + 1 + \left\lfloor \frac{N_{cell}^{ID}}{4} \right\rfloor \bmod 3 \right) \bmod 4 \text{ for } h = 1 \quad \text{Equation 14}$$

This system makes an attempt to minimize the number of cells that may have overlapping REs in both half frames. FIG. 15 shows an example of the RE locations for two cell ID separated by 4. They overlap only in one-half of DMRS REs.

Figure 16:
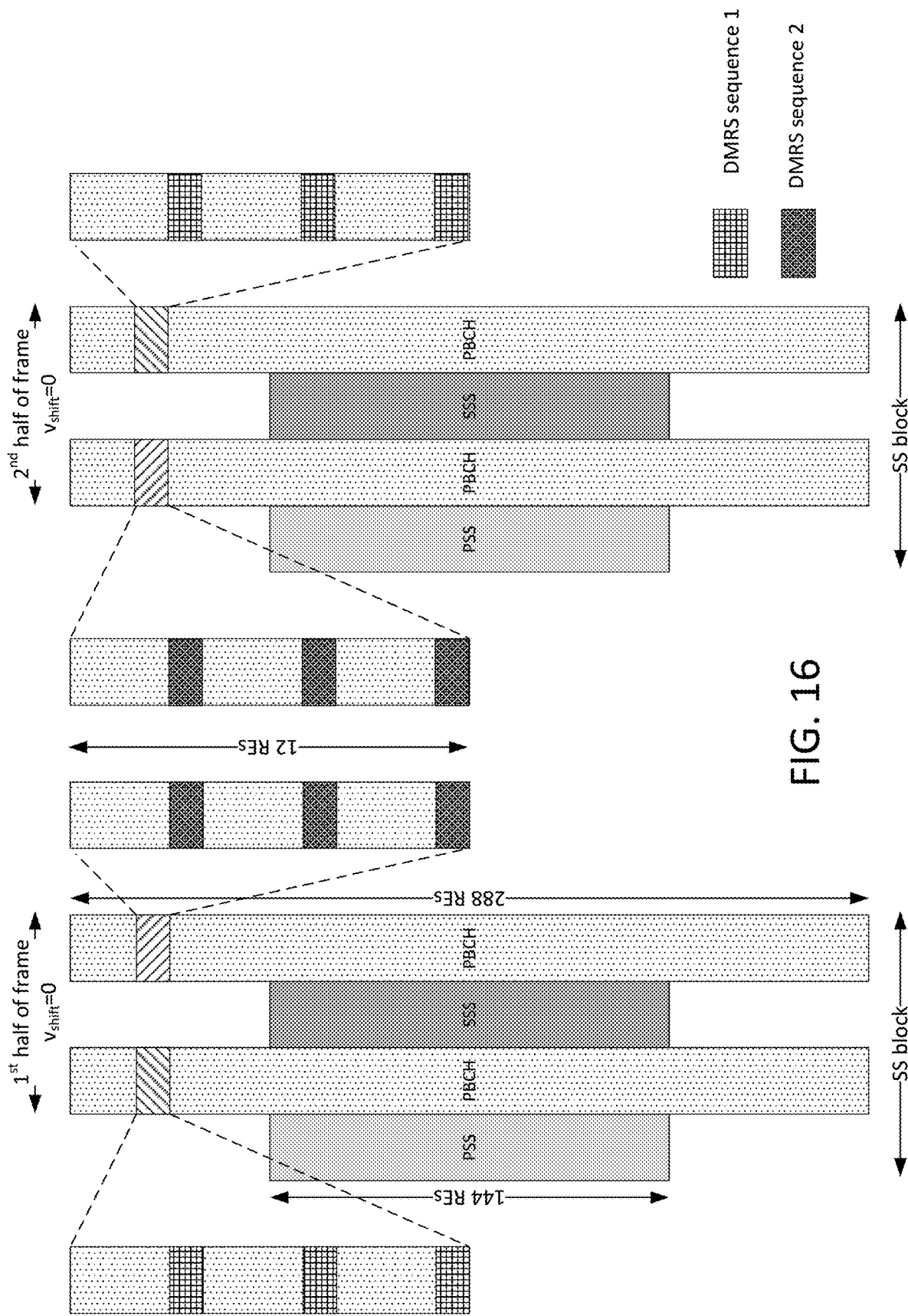
FIG. 16 illustrates an exemplary DMRS sequence switched between the PBCH symbols in the two halves of the frame.

With reference to PBCH DMRS mapping order, it may be different in each of the half frames as shown in FIG. 16. FIG. 16 illustrates an exemplary DMRS sequence switched between the PBCH symbols in the two halves of the frame The receiver may try both hypotheses in an attempt to blindly detect the PBCH DMRS sequence.

Disclosed below is further information with regard to scrambling code design for PBCH. It is contemplated that first scrambling, initialization based on Cell ID and a part of SFN, may be applied to PBCH payload excluding SS block index, half radio frame (if present) and the part of SFN prior to CRC attachment and encoding process. The part of SFN may be one the following, 1) 3 LSB bits of SFN; or 2) 2nd and 3rd LSB bits of SFN. With continued reference to first scrambling the following may be considered: 1) half radio frame index as part of the initialization of the 1st scrambling; or 2) whether or not half radio frame index is a part of PBCH payload. With regard to 2nd scrambling, there should be consideration regarding initialization based on cell ID only, is applied to encoded PBCH bits in a SS block.

In LTE, the scrambling sequence used in PBCH to scramble the MIB is generated using a gold code. The pseudo-random sequences are defined by a length-31 Gold sequence. The output sequence c(n) of length $M_{PN}$, where n=0, 1, . . . , $M_{PN}$−1, is defined by $$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

where $N_C=1600$ and the first m-sequence shall be initialized with $x_1(0)=1$, $x_1(n)=0$, $n=1, 2, \ldots, 30$. The initialization of the second m-sequence is denoted by $c_{init}=\Sigma_{i=0}^{30} x_2(i) \cdot 2^i$ with the value depending on the application of the sequence.

Figure 17A:
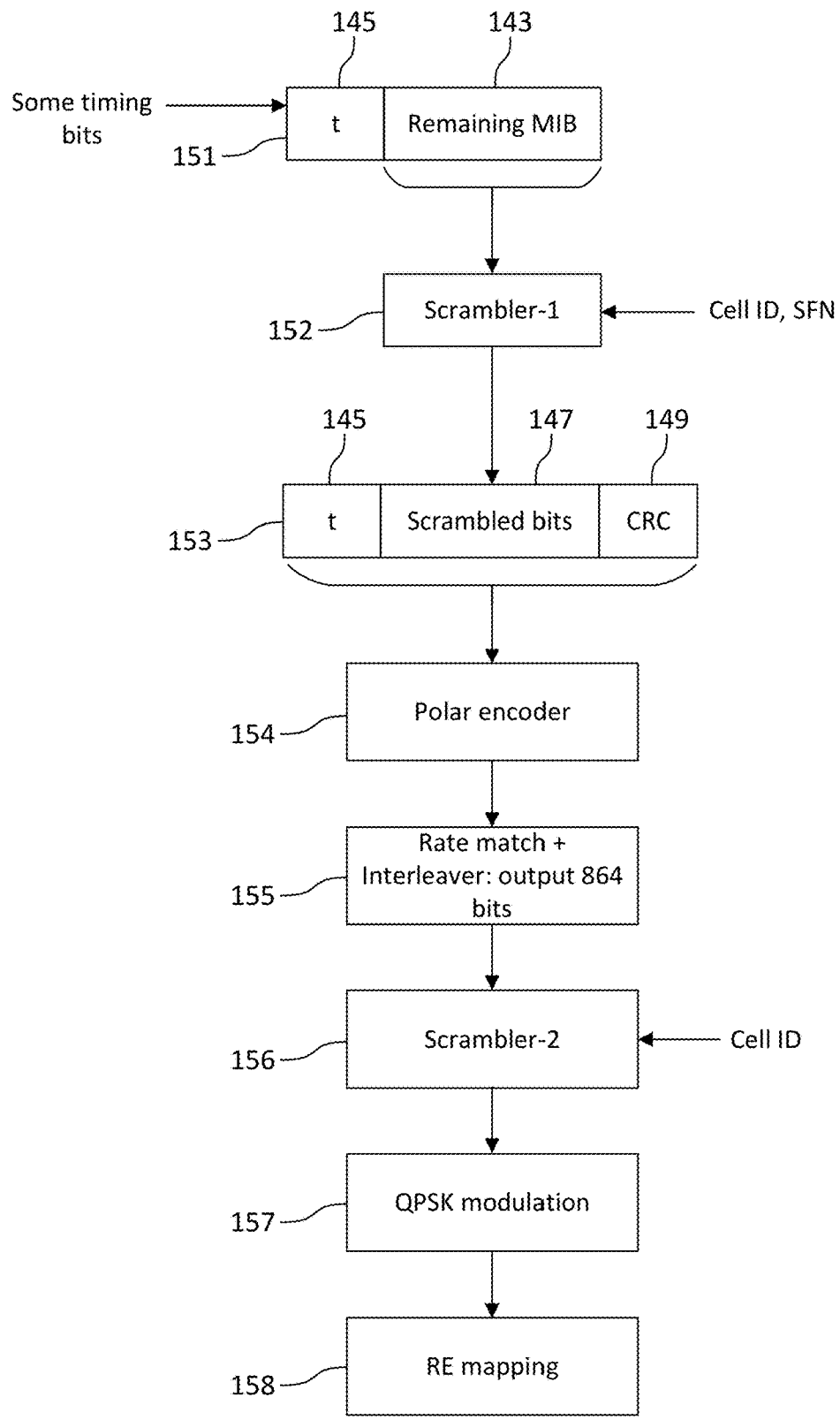
FIG. 17A illustrates an exemplary PBCH transmission chain.

In view of the aforementioned discussion regarding scrambling code design, disclosed herein, the PBCH signal may be generated by steps shown in the transmission chain in FIG. 17A. FIG. 17A illustrates an exemplary PBCH transmission chain. At step 151, an apparatus (e.g., gNB) may generate PBCH for an SS block from the PBCH payload (information that is carried on the PBCH) that includes t-block 145 and remaining MIB 143. Here 't' (in t-block 145) may denote timing bits including SS block index, half radio frame and part of SFN embedded in the scrambling process. At step 152, t-block 145 or remaining MIB 143 may be sent through scrambler-1. Stage-1 scrambling is done using 'Scrambler-1' which is a scrambler applied to the PBCH payload. In an example, for scrambling, the PBCH payload may include or exclude the timing bits denoted by T (e.g., remaining MIB 143). The sequence s for the scrambler-1 may be generated using one of the following primitive polynomials (e.g., Equation 15-Equation 17) over the finite field of GF(2) which are better suited for generating short scrambling sequences as these are meant to be only about 40-100 bits long.

$$x^5+x^2+1 \quad \text{Equation 15}$$

$$x^5+x^3+1 \quad \text{Equation 16}$$

$$x^5+x^4+x^2+x^1+1 \quad \text{Equation 17}$$

The actual sequence $s_1$ used in the stage-1 scrambling for a given SS block with a PBCH TTI may be obtained from s using a relation such as in Equation 18 or Equation 19.

$$s_1(n)=s(n+N_{cell}^{ID}+f) \bmod 31, \quad \text{Equation 18}$$

$$s_1(n)=s(n+N_{cell}^{ID}+f+b') \bmod 31, \quad \text{Equation 19}$$

where f is the integer representation of the SFN bits represented through the stage-1 scrambling (f is 2 to 3 bits), and b' corresponds to the LSB bits of the beam index indicated through the DMRS.

At step 153, the CRC (e.g., block 149) may be applied only to the scrambled part (e.g., block 147) or the entire portion including the t bits. At step 154, the vector created at step 153 may then be polar encoded. At step 155, the vector of step 154 may be rate matched to 864 bits (PBCH resources available in the SS block). Subsequently a channel interleaver is applied.

At step 156, the vector of step 155 may then be scrambled through a stage-2 scrambler which may protect against certain undesirable conditions. For example, if the scrambling sequence and the MIB inputs being scrambled in stage-1 scrambling (e.g., step 152) are identical, the output will be an all-0 vector through the stages of CRC, polar encoding (if t=0 also applies). In this QPSK output will be a single symbol for all the REs. To provide sufficient randomization, a stage-2 scrambler may be applied.

The stage-2 scrambling sequence 864-bits long $s_2$ may be generated using the gold sequence defined in LTE (e.g., 3GPP TS 36.211 v14.3.0). Cinit is the initialization value for the scrambler. The $c_{init}$ for $s_2$ may be constructed in ways such as Equation 20 or Equation 21 as a function of the cell ID or cell ID and b' which corresponds to the LSBs of the beam index indicated through the DMRS. Note that a UE may obtain b' prior to processing the PBCH resources. The initialization of the stage-2 scrambler may be performed at the start of each SS block, unlike LTE where the scrambler is reset only after the PBCH TTI is completed. This design helps ensure that during blind decoding of the PBCH in NR, the hypotheses for the SFN bits are tested after polar-decoding of the PBCH.

$$c_{init}=N_{cell}^{ID} \quad \text{Equation 20}$$

$$c_{init}=2^{12} \cdot N_{cell}^{ID}+b' \quad \text{Equation 21}$$

Figure 17B:
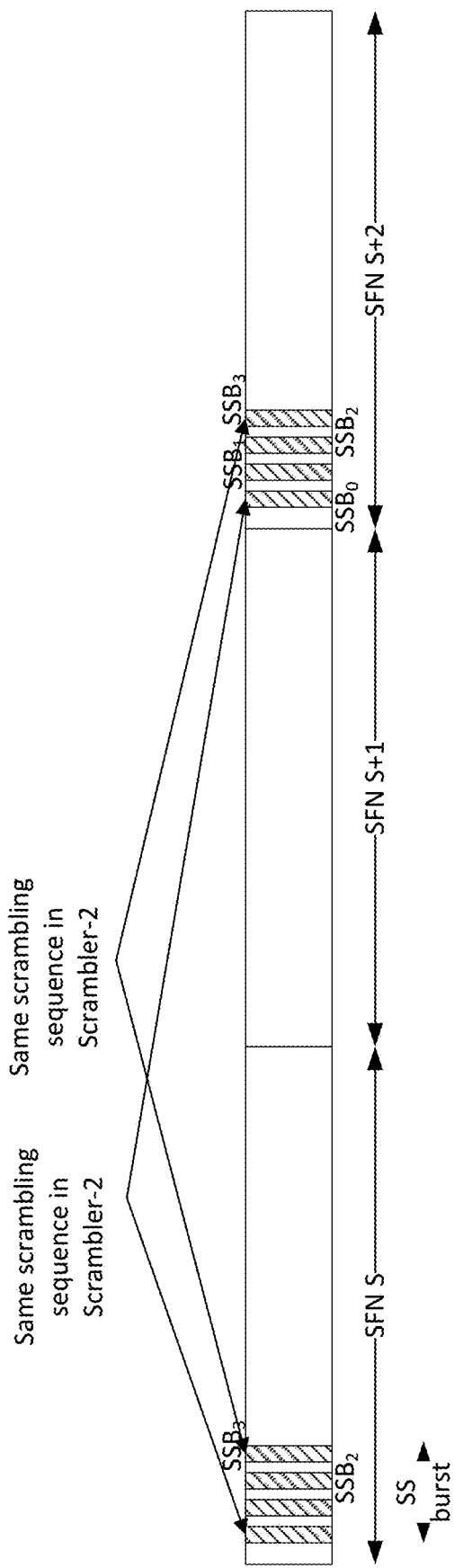
FIG. 17B illustrates an exemplary scrambling sequence applied to given SSB index across any SFN as initialization is performed at the start of each SSB.

When the scrambler is a function of b', it improves randomization of the signal and makes it more robust to co-channel interference. Initialization of scrambler-2 at the start if each SS block allows the scrambling sequence to be the same for all SS blocks of a given index, thereby making soft combining of PBCH on a given SSB index simple. This is unlike LTE where the scrambler is reset only after multiple copies of PBCH are transmitted, i.e., after the PBCH TTI is completed. With regard to NR, the complexity is higher as UE must try different hypotheses of the scrambling sequence during the process of descrambling, chase combining and decoding. FIG. 17B illustrates applying the scrambler-2 (as a function of the LSB bits b' of the SSB index) to the PBCH in an SS burst. The sequence used in step 156 of FIG. 17 is for the PBCH in SSBs with same indices in different SFNs. Here SSB0 of SFN S and SFN S+2 contain PBCH scrambled by the same scrambling sequence.

Two-step scrambling is used in generating the PBCH at the gNB. Scrambler-1 is applied prior to polar-encoding while a scrambler-2 is applied to polar-encoded PBCH payload wherein the scrambler-2 sequence may be generated using some timing information bits indicated by the SSB index. Scrambler-2 may be initialized at the start of each SSB.

At step 157, QPSK modulation may be applied to the vector of step 156. And at step 158, RE mapping may be applied to the encoded bits of the vector of step 157. Some of the steps in the PBCH generation may be common between different SSBs in a SS burst in a frame. For example, if the MSBs are the same for two SSB indices, step 151-step 155 are the same and may not be repeated.

Also disclosed herein is polar code design for PBCH. The polar code may use CRC polynomial of length (nFAR+3). For example, it may be the same used for the DL control signal (e.g. gCRC24(D)=[D24+D23+D21+D20+D17+D15+D13+D12+D8+D4+D2+D+1]). The CRC bits may be attached to the end of the information bits. Alternatively, some bits (for example 3 bits) may be distributed similar to the DL control signal. The sequence design used for UL and DL control signaling may be used for PBCH. The rate matching may be implemented in any of the following ways, which are disclosed in more detail herein: 1) Circular buffer based rate-matching to resources in one symbol followed by repetition in the second PBCH symbol; or 2) Circular buffer based rate-matching to all available PBCH resources.

Figure 18A:
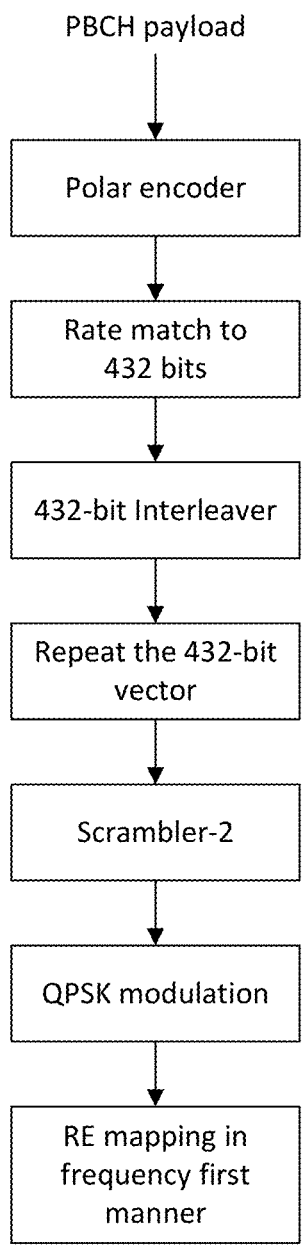
FIG. 18A illustrates an exemplary PBCH Rate matching Repeating across symbols.

With reference to circular buffer based rate-matching to resources in one symbol followed by repetition in the second PBCH symbol, polar code of rate ¼ may be used. Here the encoded bits are rate matched to 432 bits around a circular buffer in a clockwise manner similar to the rate matching used for UL and DL control. The interleaver may be applied to the 432-length vector. The 432-length vector is then repeated for the resources in the second PBCH symbol in the SS block so that the effective vector generated is 864 bits long. This is illustrated in FIG. 18A, which may be done by gNB, where PBCH is transmitted to the UE. Frequency-first mapping may be used to map the symbols to the resources, beginning from the lowest subcarrier to the largest subcarrier. This scheme is useful for decoding the PBCH self-sufficiently on reception of the leading PBCH symbol, without having to wait for the lagging PBCH symbol in the SS block. Note that the interleaving is within the resources of one 1$^{st}$ symbol so that the first symbol may be decoded self-sufficiently without relying on the second symbol. A UE with sufficient SINR will be able to decode the PBCH on receipt of the 1$^{st}$ PBCH symbol of an SS block.

Figure 18B:
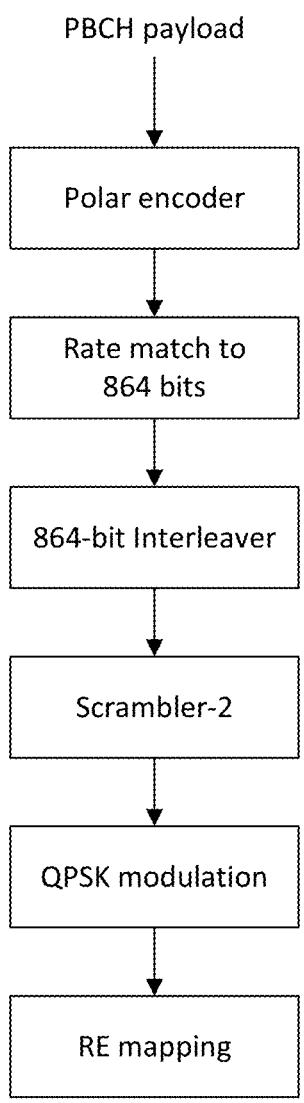
FIG. 18B illustrates an exemplary PBCH Rate matching, Rate matching across the PBCH resources in SS block.

With reference to circular buffer based rate-matching to all available PBCH resources, Polar code rate of ¼ or even lower may be used for encoding the payload. Here the encoded bits are rate matched to 864 bits in a circular buffer in a clockwise manner similar to the rate matching used for UL and DL control channels. The interleaver may be applied to the 864-length vector. This is illustrated in FIG. 18B. Frequency-first mapping beginning from the lowest subcarrier of the leading PBCH symbol may be used to map the QPSK symbols. Alternatively, time-first mapping beginning from the lowest subcarrier of leading symbol followed by lowest subcarrier of lagging symbol, followed by next subcarrier of leading symbol and so on may be used. With regard to the exemplary implementations for circular buffer based rate-matching, the interleaver used for the DL control or UL control may be reused for the PBCH.

Figure 19A:
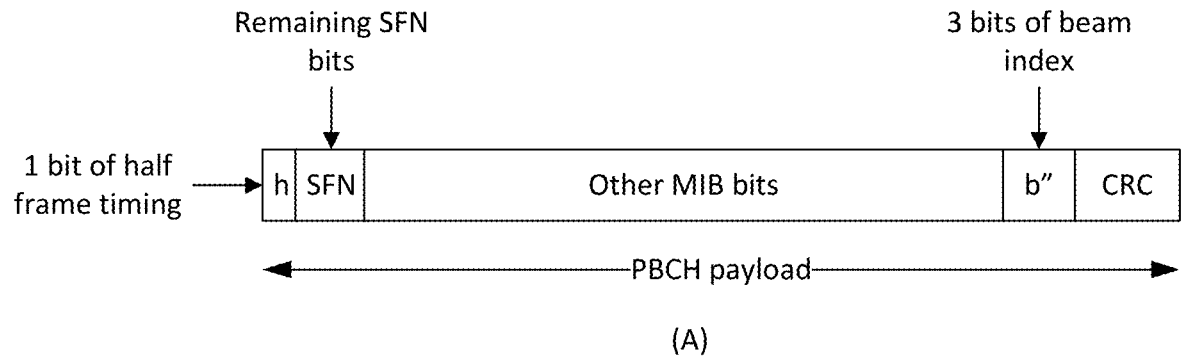
FIG. 19A illustrates an exemplary Half frame timing indicator prior to SFN.
Figure 19B:
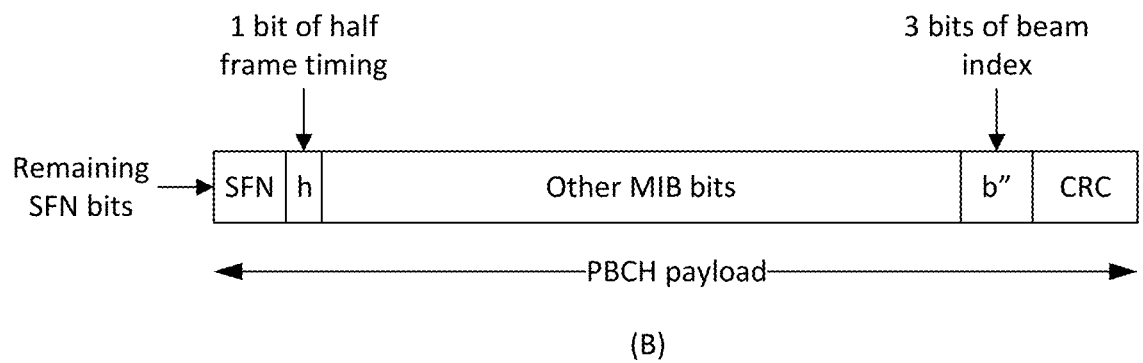
FIG. 19B illustrates an exemplary Half frame timing indicator follows the SFN bits.

The frozen bits of the polar code may be set to the $N_{cell}^{ID}$ to further increase the robustness to intercell interference. The payload of the PBCH may be mapped to the polar code input sequence in different ways, as further disclosed below. The 3 bits of beam index (for >6 GHz) represented by b" bits may be mapped to the end of the payload, prior to the CRC. This keeps the design uniform for lower carrier frequencies (<6 GHz) for which these bits may be set to zero or may carry other information. The half frame indication bit h may be indicated explicitly in the payload (in addition to indicating through scrambling sequence/DMRS) to allow for randomization between the two half frame locations—the bit introduces another equivalent scrambling sequence when it is set to 1. The remaining SFN bits not indicated by the scrambling and h may be mapped to the start of the payload mapped to the input sequence. An example is shown in FIG. 19A-FIG. 19B. The half frame time indicator may occur before the SFN bits (FIG. 19A) or follow the SFN bits (FIG. 19B).

The required number of remaining MIB bits (other than the SFN, half frame and beam index bits indicated through the payload) for below 6 GHz and above 6 GHz cases may be different. Since a unified design (bit width) may work well, if a use case does not have information to use all the available bits, it may do the following for those bits: 1) transmit zeros; or 2) transmit certain RMSI or OSI on those bits. For example, indication of whether certain UEs may camp on the cell may be included in the MIB.

Figure 20:
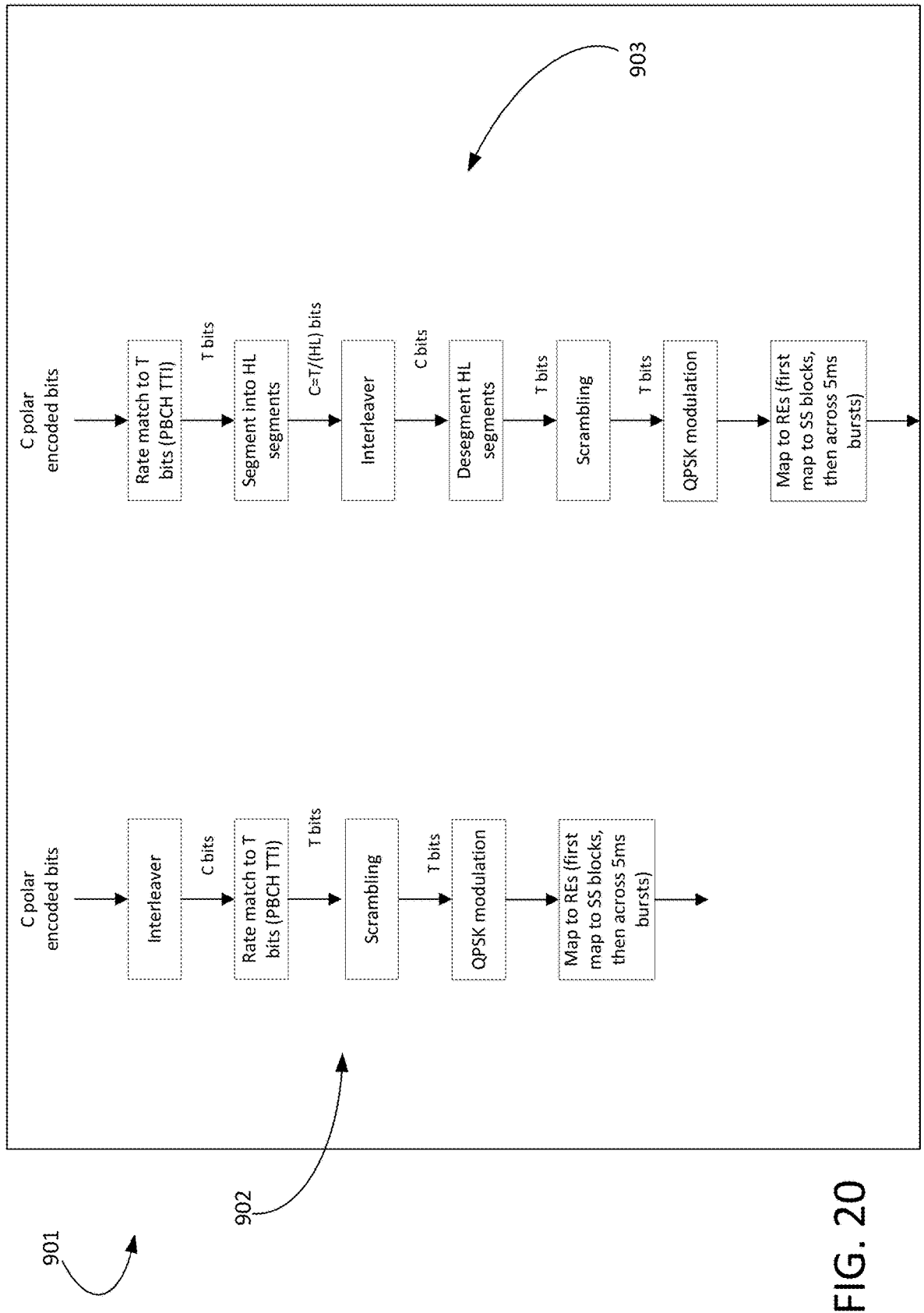
FIG. 20 illustrates an exemplary display (e.g., graphical user interface) that may be generated based on the methods and systems discussed herein.

FIG. 20 illustrates an exemplary display (e.g., graphical user interface) that may be generated based on the methods and systems of PBCH timing or polar code design, as discussed herein. Display interface 901 (e.g., touch screen display) may provide text in block 902 associated with PBCH timing or polar code design. Progress of any of the steps (e.g., sent messages or success of steps) discussed herein may be displayed in block 902. In addition, graphical output 902 may be displayed on display interface 901. Graphical output 903 may be the topology of the devices implementing the methods and systems of PBCH timing or polar code design, a graphical output of the progress of any method or systems discussed herein, or the like. Table 5 provides example definitions of abbreviations disclosed herein.

TABLE 5

| Abbreviations | |
|---|---|
| A/N | Ack/Nack |
| BCCH | Broadcast Control Channel |
| BCH | Broadcast Channel |
| CB | Code Block |
| CP | Cyclic Prefix |
| CRC | Cyclic Redundancy Check |
| C-RNTI | Cell Radio-Network Temporary Identifier |
| DL | Downlink |
| HARQ | Hybrid Automatic Repeat Request |
| LTE | Long term Evolution |
| MAC | Medium Access Control |
| MIB | Master Information Block |
| NR | New Radio |
| OFDM | Orthogonal frequency division multiplexing |
| PBCH | Physical Broadcast Channel |
| PDCCH | Physical Downlink Control Channel |
| PDNICH | Physical Downlink Numerology Indication Channel |
| PDSCH | Physical Downlink Shared Data Channel |
| PUSCH | Physical Uplink Shared Channel |
| PUCCH | Physical Uplink Control Channel |
| PRACH | Physical Random Access Channel |
| PRB | Physical Resource Block |
| RAN | Radio Access Network |
| RAT | Radio Access Technology |
| RB | Resource block |
| RE | Resource Element |
| RNTI | Radio Network Temporary Identifier |
| RRC | Radio Resource Control |
| RV | Redundancy Version |
| SC-FDMA | Single carrier frequency division multiple access |
| SFN | System Frame Number |
| SI | System Information |
| SIB | System Information Block |
| SI-RNTI | System Information RNTI |
| SPS-RNTI | Semi persistent scheduling RNTI |
| SR | Scheduling Request |
| TBS | Transport Block Size |
| TB | Transport Block |
| TDD | Time Division Duplex |
| TRP | Transmission and Reception Point |
| TTI | Transmission Time Interval |
| UE | User Equipment |
| UL | Uplink |
| URLLC | Ultra-Reliable and Low Latency Communications |

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific services and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 21A:
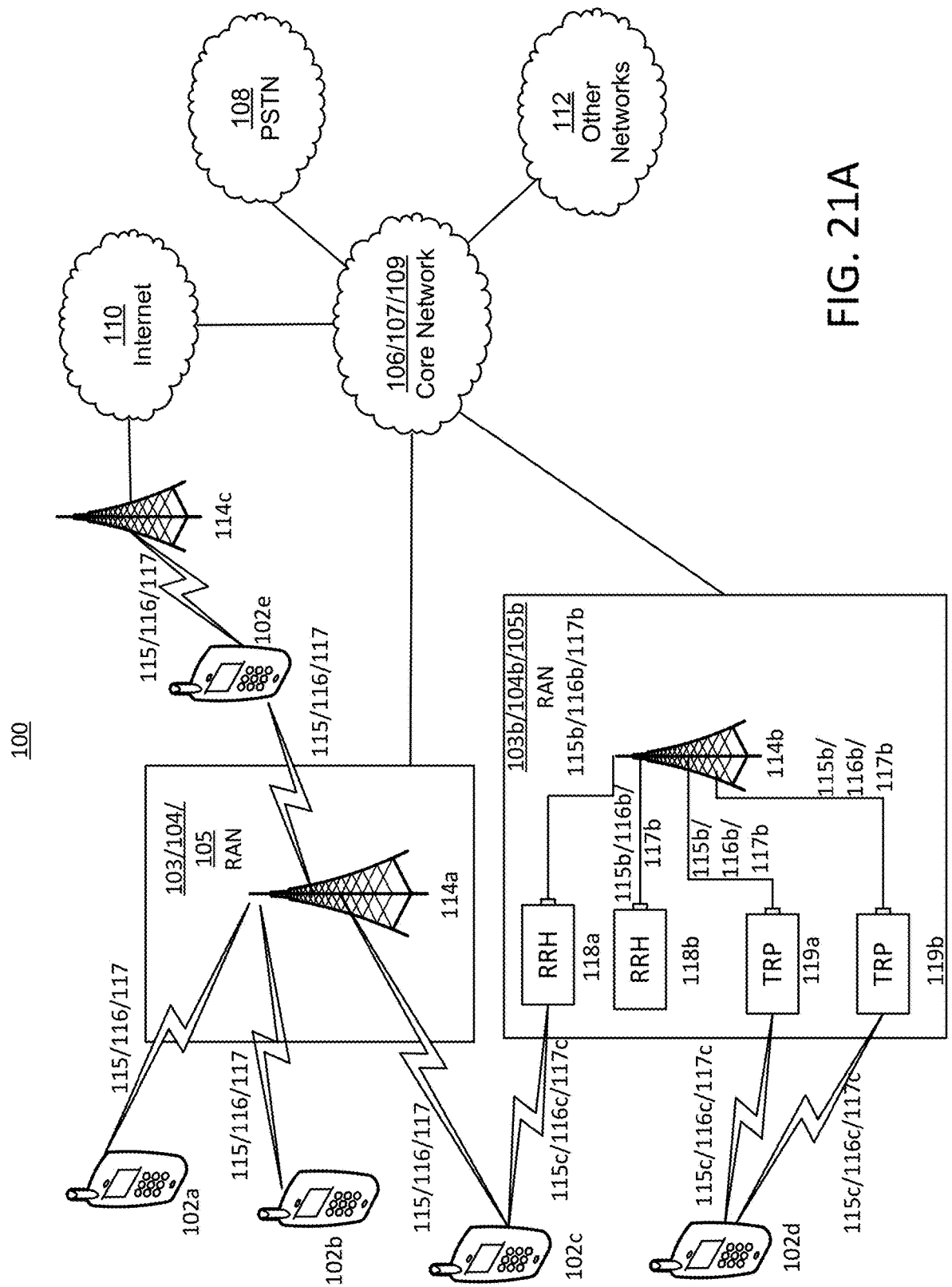
FIG. 21A illustrates an example communications system 100 in which the methods and apparatuses described and claimed herein associated with beam management.

FIG. 21A illustrates an example communications system 100 in which the methods and apparatuses of PBCH timing or polar code design, such as the systems and methods illustrated in FIG. 2 through FIG. 14 described and claimed herein may be embodied. As shown, the example communications system 100 may include wireless transmit/receive units (WTRUs) 102a, 102b, 102c, or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed examples contemplate any number of WTRUs, base stations, networks, or network elements. Each of the WTRUs 102a, 102b, 102c, 102d, 102e may be any type of apparatus or device configured to operate or communicate in a wireless environment. Although each WTRU 102a, 102b, 102c, 102d, 102e is depicted in FIG. 21A, FIG. 21B, FIG. 21C, FIG. 21D, and FIG. 21E as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, or the other networks 112. Base stations 114b may be any type of device configured to wiredly or wirelessly interface with at least one of the RRHs (Remote Radio Heads) 118a, 118b or TRPs (Transmission and Reception Points) 119a, 119b to facilitate access to one or more communication networks, such as the core network 106/107/109, the Internet 110, or the other networks 112. RRHs 118a, 118b may be any type of device configured to wirelessly interface with at least one of the WTRU 102c, to facilitate access to one or more communication networks, such as the core network 106/107/109, the Internet 110, or the other networks 112. TRPs 119a, 119b may be any type of device configured to wirelessly interface with at least one of the WTRU 102d, to facilitate access to one or more communication networks, such as the core network 106/107/109, the Internet 110, or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations or network elements.

The base station 114a may be part of the RAN 103/104/105, which may also include other base stations or network elements (not shown), such as a base station controller (BSC), a radio network controller (RNC), relay nodes, etc. The base station 114b may be part of the RAN 103b/104b/105b, which may also include other base stations or network elements (not shown), such as a base station controller (BSC), a radio network controller (RNC), relay nodes, etc. The base station 114a may be configured to transmit or receive wireless signals within a particular geographic region, which may be referred to as a cell (not shown) for methods and systems of PBCH timing or polar code design, as disclosed herein. The base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 may implement 3GPP NR technology.

In an example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 21A may be a wireless router, Home Node B, Home eNode B, or access point, for example, and may utilize any suitable RAT for facilitating wireless connectivity in a localized area, such as a place of business, a home, a vehicle, a campus, and the like, for implementing the methods and systems of PBCH timing or polar code design, as disclosed herein. In an example, the base station 114c and the WTRUs 102e, may implement a radio technology such as IEEE 802.11 to establish a wireless local area network (WLAN). In an example, the base station 114c and the WTRUs 102d, may implement a radio technology such as IEEE 802.15 to establish a wireless personal area network (WPAN). In yet another example, the base station 114c and the WTRUs 102e, may utilize a cellular-based RAT (e.g., WCDMA, CDMA2000, GSM, LTE, LTE-A, etc.) to establish a picocell or femtocell. As shown in FIG. 21A, the base station 114b may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., or perform high-level security functions, such as user authentication.

Although not shown in FIG. 21A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include another core network connected to one or more RANs, which may employ the same RAT as the RAN 103/104/105 or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 21A may be configured to communicate with the base station 114a, which may employ a cellular-based radio technology, and with the base station 114c, which may employ an IEEE 802 radio technology.

Figure 21B:
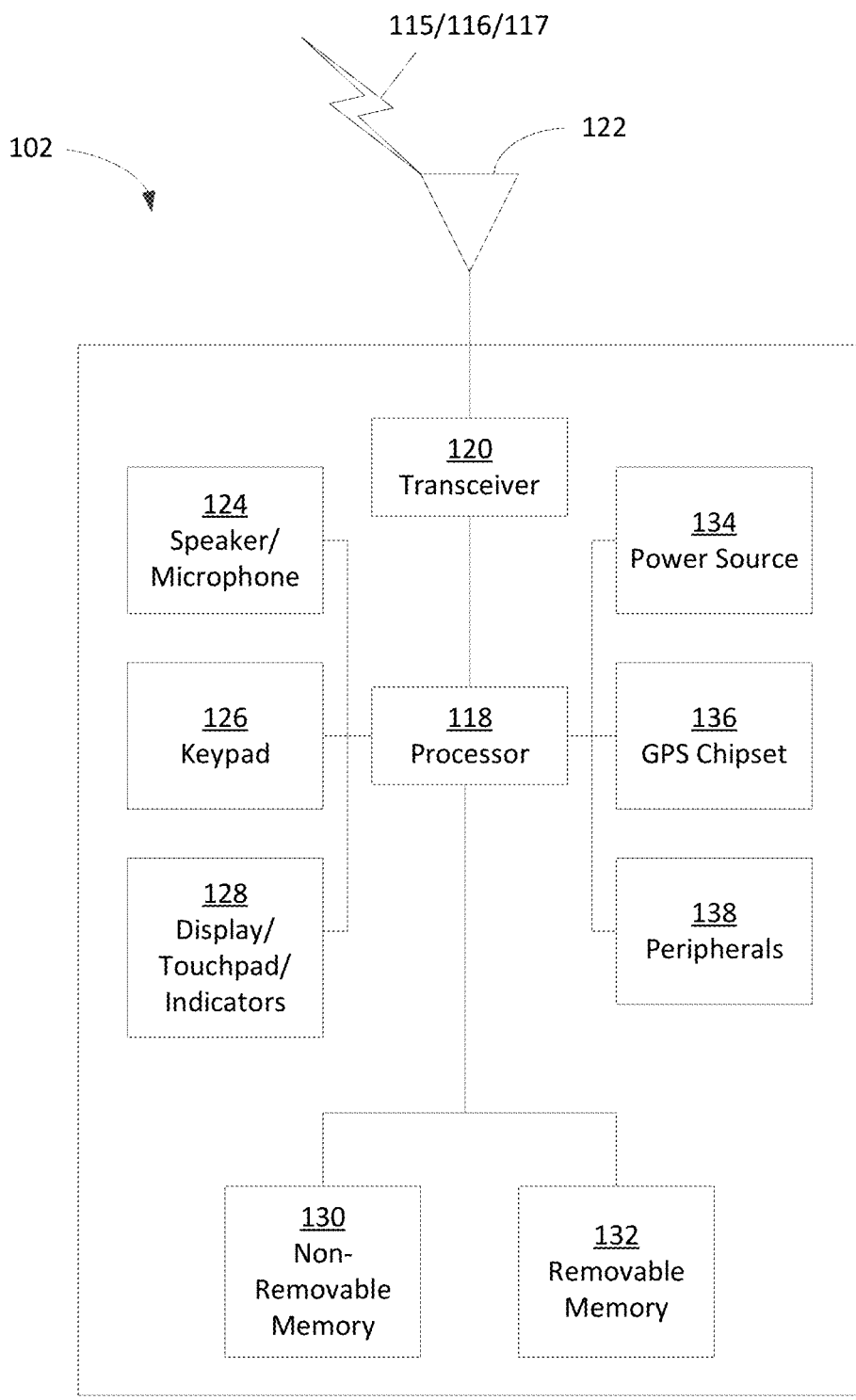
FIG. 21B is a block diagram of an example apparatus or device configured for wireless communications in accordance with the beam management illustrated herein.

FIG. 21B is a block diagram of an example apparatus or device configured for wireless communications in accordance with the examples illustrated herein, such as for example, a WTRU 102. As shown in FIG. 21B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an example. Also, examples contemplate that the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 21B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 21B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an example, the transmit/receive element 122 may be an antenna configured to transmit or receive RF signals. Although not shown in FIG. 21A, it will be appreciated that the RAN 103/104/105 or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links for implementing methods and systems of PBCH timing and polar code design, as disclosed herein. For example, the WTRU 102c shown in FIG. 21A may be configured to communicate with the base station 114a, which may employ a cellular-based radio technology, and with the base station 114b, which may employ an IEEE 802 radio technology.

FIG. 21B is a block diagram of an example apparatus or device configured for wireless communications in accordance with methods and systems PBCH timing or polar code design, as disclosed herein, such as for example, a WTRU 102 implementing the method of FIG. 12, decoding SS block of FIG. 7, or using equations 1-8. As shown in FIG. 21B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an example. Also, the examples herein contemplate that the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 21B and may be an exemplary implementation that performs the disclosed systems and methods for PBCH timing or polar code design described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 21B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an example, the transmit/receive element 122 may be an antenna configured to transmit or receive RF signals. In an example, the transmit/receive element 122 may be an emitter/detector configured to transmit or receive IR, UV, or visible light signals, for example. In yet another example, the transmit/receive element 122 may be configured to transmit and receive both RF and light signals. It will be appreciated that the transmit/receive element 122 may be configured to transmit or receive any combination of wireless signals.

In addition, although the transmit/receive element 122 is depicted in FIG. 21B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit). The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other examples, the processor 118 may access information from, and store data in, memory that is not physically located on the WTRU 102, such as on a server or a home computer (not shown). The processor 118 may be configured to control lighting patterns, images, or colors on the display or indicators 128 in response to whether the PBCH timing or aspects of polar code in some of the examples described herein are successful or unsuccessful, or otherwise indicate a status of PBCH timing or aspects of polar code and associated components. The control lighting patterns, images, or colors on the display or indicators 128 may be reflective of the status of any of the method flows, equations, or components in the FIG.'s illustrated or discussed herein (e.g., Equations 1-8, FIG. 12, FIG. 13A, or FIG. 13B). Disclosed herein are messages and procedures of PBCH timing or polar code design. The messages and procedures may be extended to provide interface/API for users to request resources via an input source (e.g., speaker/microphone 124, keypad 126, or display/touchpad/indicators 128) and request, configure, or query PBCH timing or polar code design related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method while remaining consistent with an example.

The processor 118 may further be coupled to other peripherals 138, which may include one or more software or hardware modules that provide additional features, functionality or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be used for other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 21C:
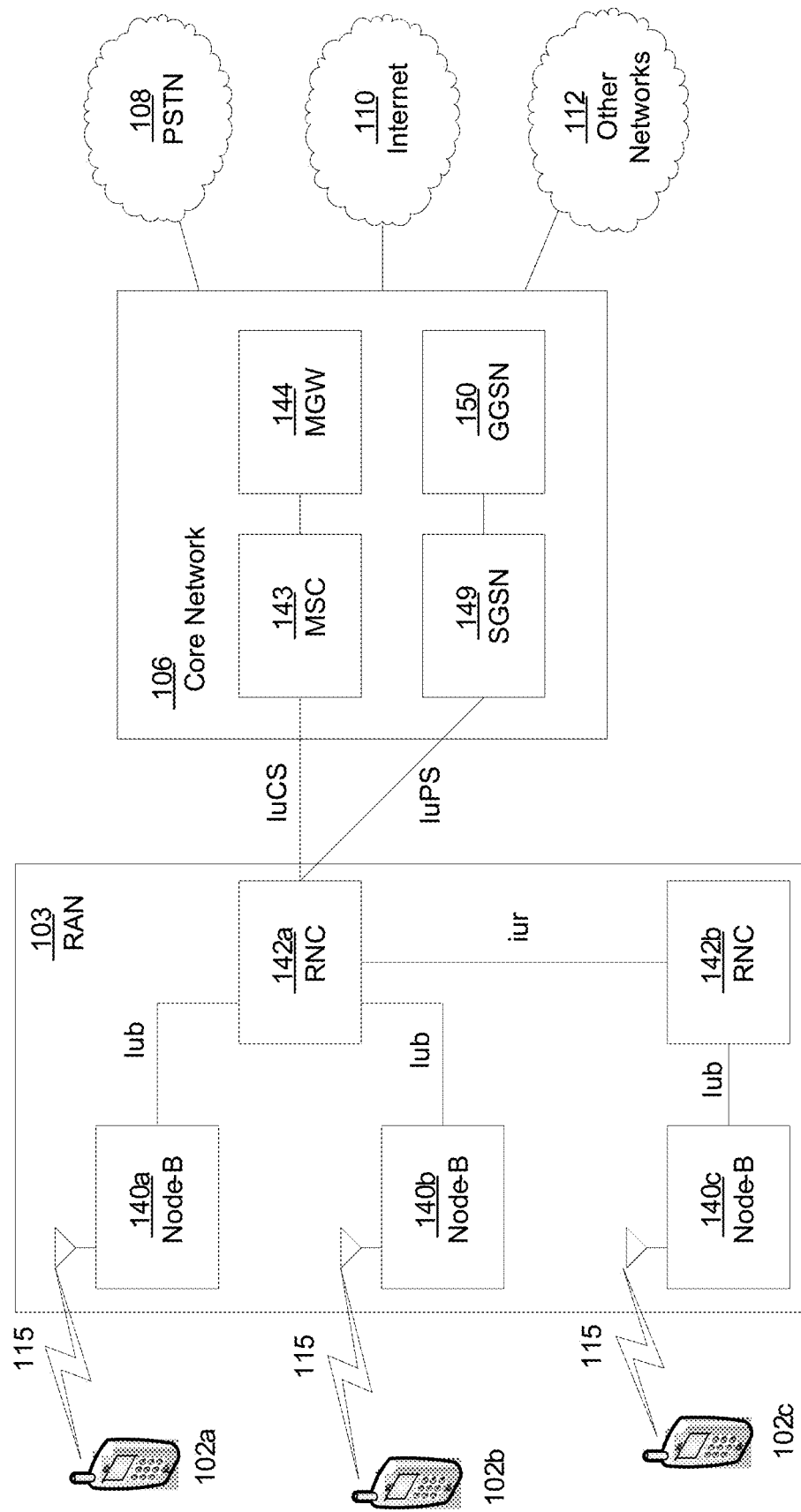
FIG. 21C is a system diagram of the RAN 103 and the core network 106 according to beam management as discussed herein.

FIG. 21C is a system diagram of the RAN 103 and the core network 106 that may implement the methods and systems of PBCH timing or polar code design, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 21C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an example.

As shown in FIG. 21C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 21C may include a media gateway (MGW) 144, a mobile switching center (MSC) 146, a serving GPRS support node (SGSN) 148, or a gateway GPRS support node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned or operated by other service providers.

Figure 21D:
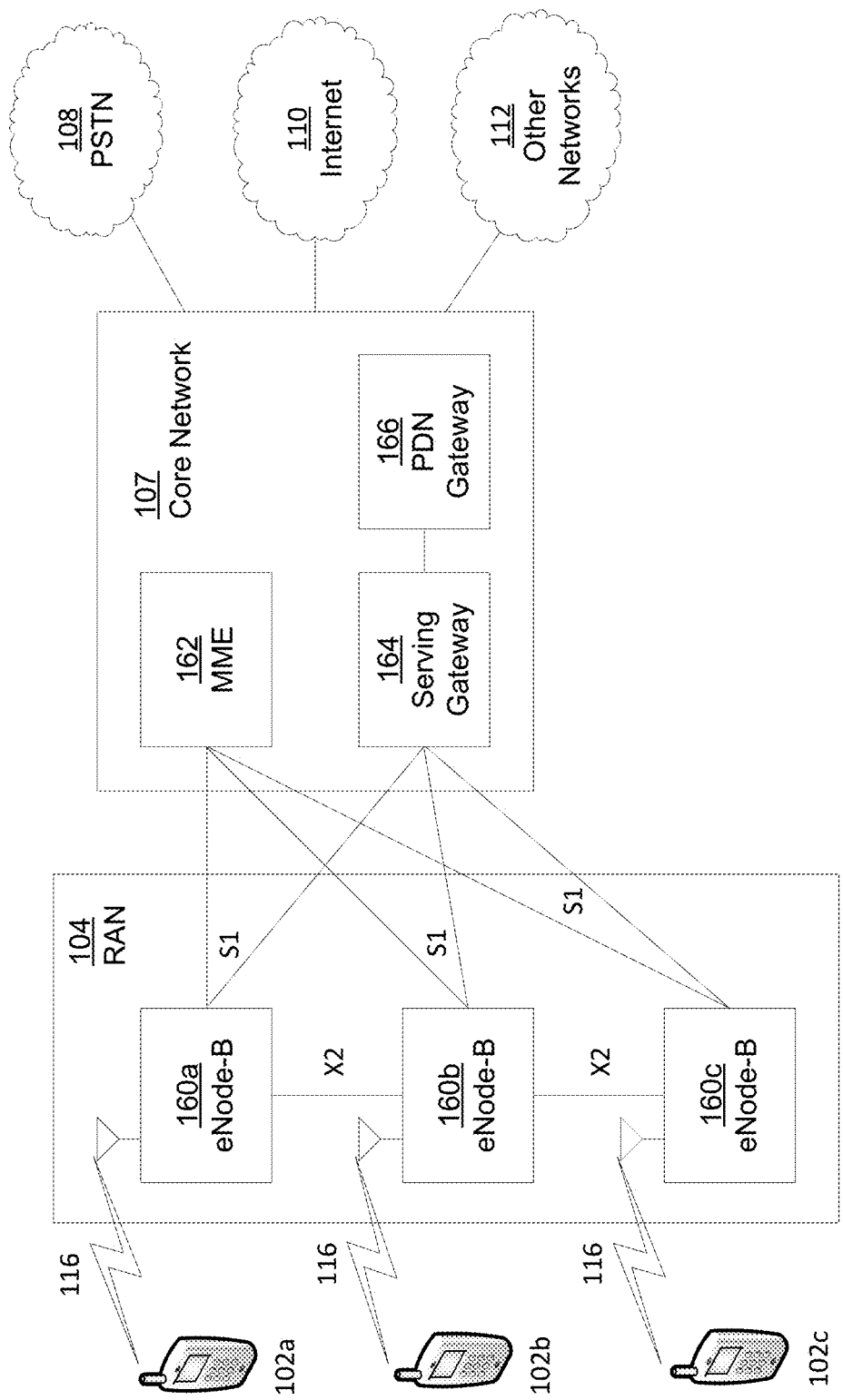
FIG. 21D is a system diagram of the RAN 104 and the core network 107 according to beam management as discussed herein.

FIG. 21D is a system diagram of the RAN 104 and the core network 107 that may implement methods and systems of PBCH timing or polar code design, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an example. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 21D, the eNode-Bs 160a, 160b, 160c may communicate with one another over an X2 interface.

The core network 107 shown in FIG. 21D may include a mobility management gateway (MME) 162, a serving gateway 164, and α packet data network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned or operated by other service providers.

Figure 21E:
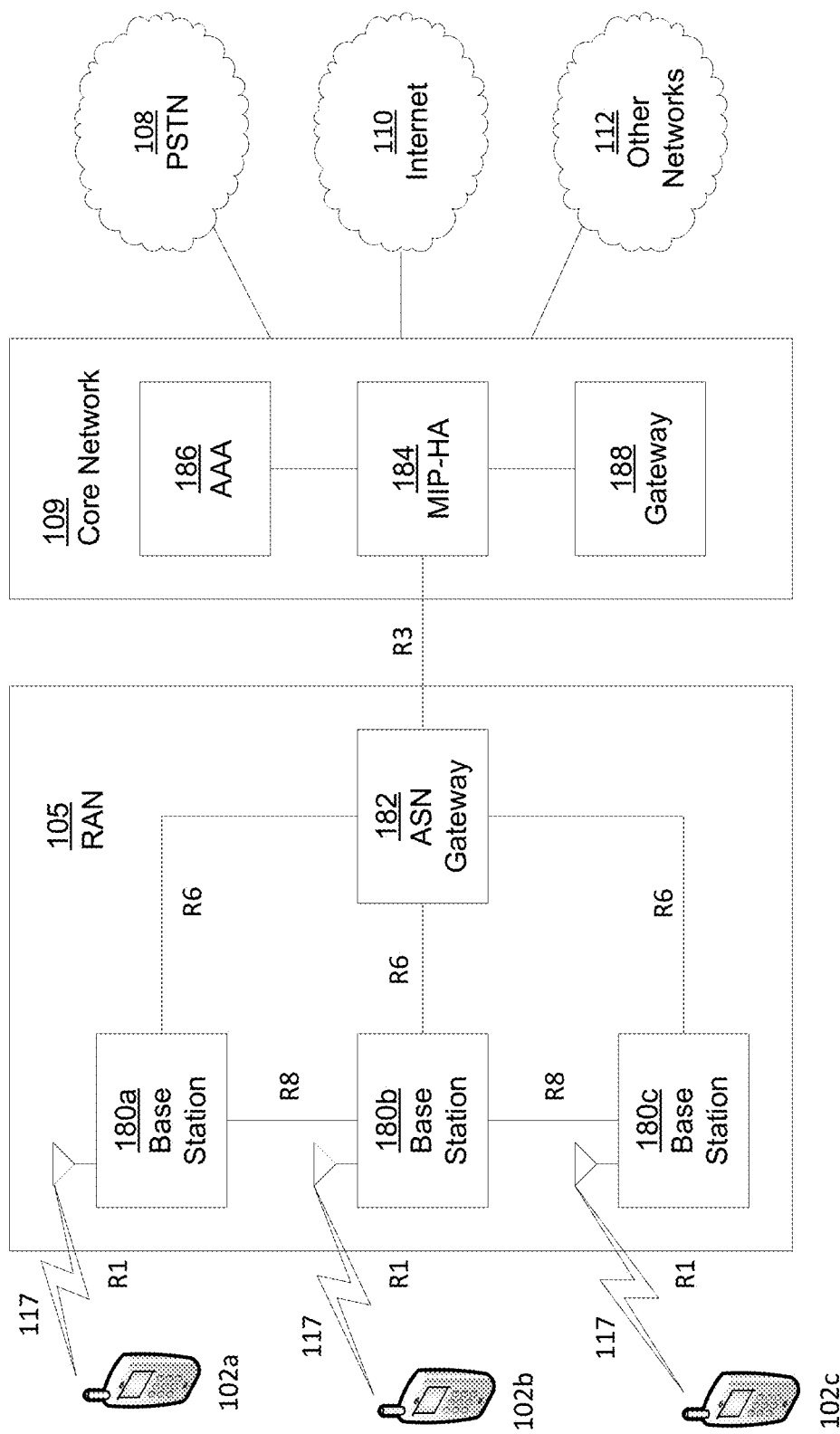
FIG. 21E is a system diagram of the RAN 105 and the core network 109 which may be associated with beam management as discussed herein.

FIG. 21E is a system diagram of the RAN 105 and the core network 109 that may implement methods and systems of PBCH timing or polar code design, as disclosed herein. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 21E, the RAN 105 may include base stations 180a, 180b, 180c, and an ASN gateway 182, though it will be appreciated that the RAN 105 may include any number of base stations and ASN gateways while remaining consistent with an example. The base stations 180a, 180b, 180c may each be associated with a particular cell in the RAN 105 and may include one or more transceivers for communicating with the WTRUs 102a, 102b, 102c over the air interface 117. In an example, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 21E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and α gateway 188. While each of the foregoing elements are depicted as part of the core network 109, it will be appreciated that any one of these elements may be owned or operated by an entity other than the core network operator.

The MIP-HA may be responsible for IP address management, and may enable the WTRUs 102a, 102b, and 102c to roam between different ASNs or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned or operated by other service providers.

Although not shown in FIG. 21E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIG. 21A, FIG. 21C, FIG. 21D, and FIG. 21E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 21A, FIG. 21B, FIG. 21C, FIG. 21D, and FIG. 21E are provided by way of example only, and it is understood that the subject matter disclosed and claimed herein may be implemented in any similar communication system, whether presently defined or defined in the future.

Figure 21F:
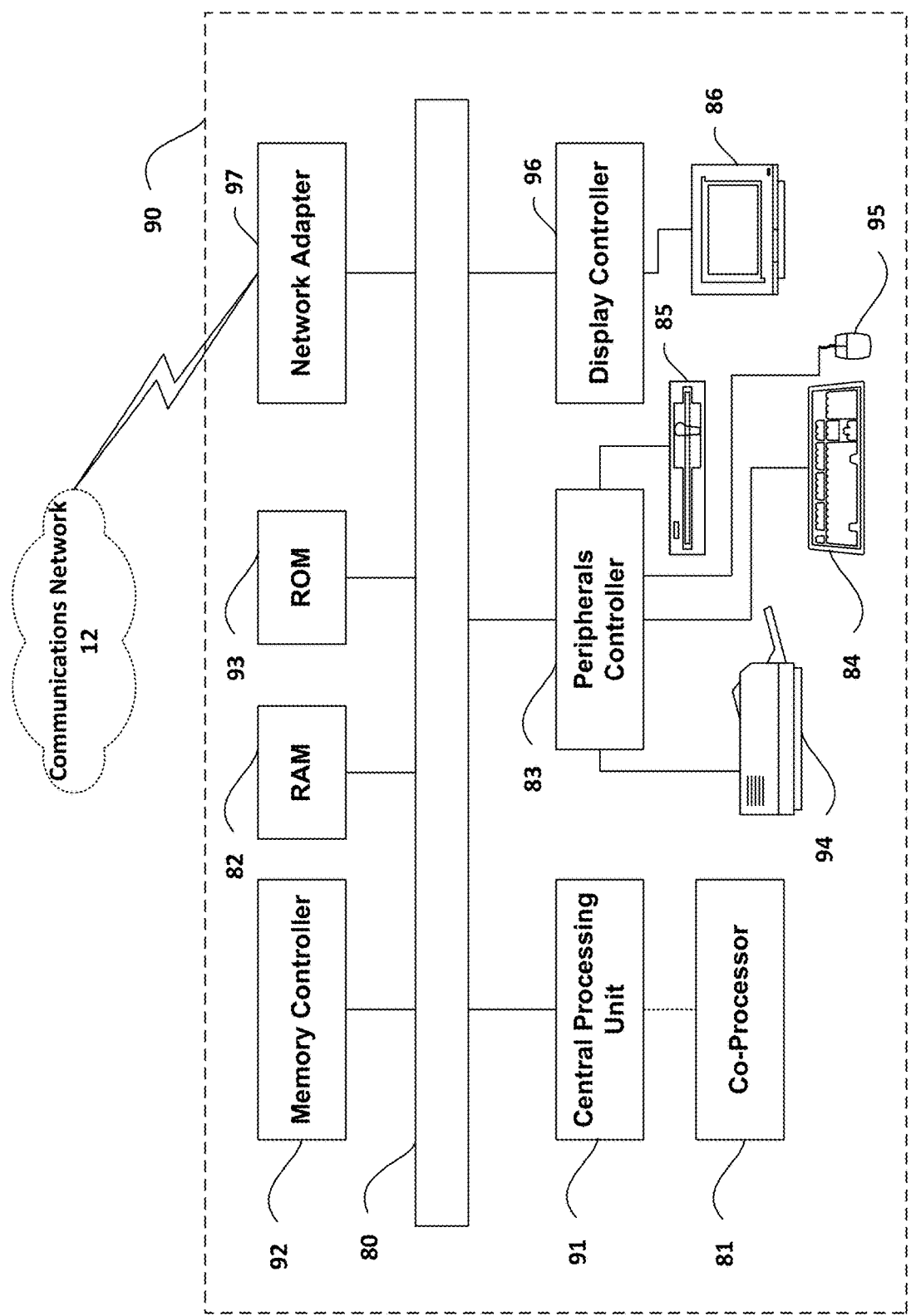
FIG. 21F is a block diagram of an exemplary computing system 90 in which one or more apparatuses of the communications networks illustrated in FIGS. 16A, 16C, 16D, and 16E may be associated with beam management as discussed herein.

FIG. 21F is a block diagram of an exemplary computing system 90 in which one or more apparatuses of the communications networks illustrated in FIG. 21A, FIG. 21C, FIG. 21D, and FIG. 21E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for PBCH timing or polar code design.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIG. 21A, FIG. 21B, FIG. 21C, FIG. 21D, and FIG. 21E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations or functions described herein may be implemented in the form of such computer executable instructions, executing on the processor of an apparatus or computing system configured for wireless or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—PBCH timing or polar code design—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims. Table 4 is a list of acronyms relating to service level technologies that may appear in the above description. Unless otherwise specified, the acronyms used herein refer to the corresponding term listed below.

Methods, systems, and apparatuses, among other things, as described herein may provide means for PBCH timing or polar code design. A method, system, computer readable storage medium, or apparatus has means for providing a signal in which timing information is indicated based on a generated de-modulation reference signal (DMRS). DMRS position within a resource block may indicate a half frame. The apparatus may be a network node. A method, system, computer readable storage medium, or apparatus has means for receiving a signal in which timing information is indicated based on a generated de-modulation reference signal (DMRS); blindly decoding the DMRS from multiple PBCH symbols together for possible sequences relating to b', wherein possible sequences relating to b' is 8 sequences for 3 bits; and selecting the sequence with the highest correlation as the suitable candidate. The apparatus may be a user equipment. A method, system, computer readable storage medium, or apparatus has means for indicating timing through scrambling sequences for half frame indication or least significant bit (LSB) of system frame number. A method, system, computer readable storage medium, or apparatus has means for indicating half frame timing through time-specific resource element mapping. A method, system, computer readable storage medium, or apparatus has means for executing a transmission chain including rate matching, interleaving, and scrambling for PBCH. A method, system, computer readable storage medium, or apparatus has means for mapping timing bits to high reliability locations in the polar code payload. A method, system, computer readable storage medium, or apparatus has means for. A method, system, computer readable storage medium, or apparatus has means for indicating intra-slot timing based on time specific cover sequence or phase rotation. A method, system, computer readable storage medium, or apparatus has means for applying a trapezoid interleaver to polar codes. A method, system, computer readable storage medium, or apparatus has means for interleaving pattern-based timing identification for PBCH timing. All combinations in this paragraph (including the removal or addition of steps) are contemplated in a manner that is consistent with the other portions of the detailed description.

A method, system, computer readable storage medium, or apparatus has means for obtaining PBCH payload; scrambling the PBCH payload except for the timing bits based on cell identifier or system frame number to a first scrambled PBCH payload, wherein the first scrambled PBCH payload comprises the scrambled payload and the timing bits; generating and adding a CRC to the first scrambled payload; encoding the first scrambled payload based on a polar encoder; rate matching and interleaving the encoded first scrambled payload based on a particular number of bits; scrambling the rate matched and interleaved first scrambled payload based on the cell identifier; and modulating the scrambled first scrambled payload. The cell identifier may be called NcellID, which indicates that a signal belongs/originates in a particular cell with that ID. A method, system, computer readable storage medium, or apparatus has means for obtaining PBCH payload; encoding the PBCH payload based on polar encoder; rate matching to the available PBCH resources in one symbol; and interleaving, the rate matched bits. A method, system, computer readable storage medium, or apparatus has means for obtaining PBCH payload; encoding the PBCH payload based on polar encoder; rate matching to the available PBCH resources in one symbol; interleaving, the rate matched bits; scrambling the bits; modulating; and mapping the resource elements in frequency first manner. A method, system, computer readable storage medium, or apparatus has means for obtaining a PBCH payload, the PBCH payload comprising: a half frame indication; subsequent to the half frame indication, a system frame number (SFN); subsequent to the SFN, other master information block (MIB); subsequent to the other MIB information, beam index; and subsequent to beam index, cyclic redundancy check. A method, system, computer readable storage medium, or apparatus has means for generating a PBCH payload, the PBCH payload comprising: a half frame indication; subsequent to the half frame indication, a system frame number (SFN); subsequent to the SFN, other master information block (MIB); subsequent to the other MIB information, beam index; and subsequent to beam index, cyclic redundancy check. A method, system, computer readable storage medium, or apparatus has means for encoding timing bits in the polar code payload without Cyclic Redundancy Check. A method, system, computer readable storage medium, or apparatus has means for obtaining a physical broadcast channel, PBCH, payload, wherein the PBCH payload comprises a master information block; scrambling the PBCH payload based on a first scrambler, the scrambled PBCH payload creating a first vector; polar encoding the first vector to generate a second vector; scrambling the second vector based on a second scrambler, the scrambled second vector creating a third vector; and generating the PBCH signal based on the third vector. All combinations in this paragraph (including the removal or addition of steps) are contemplated in a manner that is consistent with the other portions of the detailed description.

What is claimed:

1. An apparatus for wireless communication, the apparatus comprising:
   a processor; and
   a memory coupled with the processor, the memory storing executable instructions that when executed by the processor cause the processor to effectuate operations comprising:
      obtaining a physical broadcast channel (PBCH) payload, wherein the payload indicates at least 3 bits of a synchronization signal (SS) block timing index;
      scrambling the PBCH payload based on a first scrambler, the scrambled PBCH payload creating a first sequence, wherein the first scrambler indicates at least 2 bits of the SS block timing index;
      polar encoding the first sequence to generate a first encoded sequence;
      scrambling the first encoded sequence based on a second scrambler, the scrambled first encoded sequence creating a second encoded sequence;
      generating a PBCH signal based on the second encoded sequence;
      obtaining a demodulation reference signal (DMRS) sequence based on a cell identifier and least significant bits of a SS block timing index, wherein the DMRS sequence is generated by using random sequence initialized with the cell identifier and the at least 2 bits of the SS block timing index;
      generating a DMRS based on the DMRS sequence; and
      transmitting a SS block comprising the PBCH signal and the DMRS according to the SS block timing index.

2. The apparatus of claim 1, wherein the first scrambler is based on the cell identifier.

3. The apparatus of claim 1, wherein the second scrambler is based on the cell identifier.

4. The apparatus of claim 1, wherein the second scrambler is based on the cell identifier and the least significant bits of a SS block index.

5. The apparatus of claim 1, wherein the second scrambler is based on least significant bits of a SS block index.

6. The apparatus of claim 1, wherein the second scrambler is initialized at a start of each SS block.

7. The apparatus of claim 1, wherein the second scrambler is initialized at a start of each SS block within a SS burst.

8. A method for wireless communication, the method comprising:
   obtaining a physical broadcast channel (PBCH) payload, wherein the payload indicates at least 3 bits of a synchronization signal (SS) block timing index;
   scrambling the PBCH payload based on a first scrambler, the scrambled PBCH payload creating a first sequence, wherein the first scrambler indicates at least 2 bits of the SS block timing index;
   polar encoding the first sequence to generate a first encoded sequence;
   scrambling the first encoded sequence based on a second scrambler, the scrambled first encoded sequence creating a second encoded sequence;
   generating a PBCH signal based on the second encoded sequence;
   obtaining a demodulation reference signal (DMRS) sequence based on a cell identifier and least significant bits of a SS block timing index, wherein the DMRS sequence is generated by using random sequence initialized with the cell identifier and the at least 2 bits of the SS block timing index;
   generating a DMRS based on the DMRS sequence; and
   transmitting a SS block comprising the PBCH signal and the DMRS according to the SS block timing index.

9. The method of claim 8, wherein the first scrambler is based on the cell identifier.

10. The method of claim 8, wherein the second scrambler is based on the cell identifier.

11. The method of claim 8, wherein the second scrambler is based on the cell identifier and the least significant bits of a SS block index.

12. The method of claim 8, wherein the second scrambler is based on least significant bits of a SS block index.

13. The method of claim 8, wherein the second scrambler is initialized at a start of each SS block.

14. The method of claim 8, wherein the second scrambler is initialized at a start of each SS block within a SS burst.

15. An apparatus for wireless communication, the apparatus comprising:
   a processor; and
   a memory coupled with the processor, the memory storing executable instructions that when executed by the processor cause the processor to effectuate operations comprising:
      receiving, from a network node, a synchronization signal (SS) block comprising a physical broadcast channel (PBCH) signal, and a demodulation reference signal (DMRS),
      wherein the PBCH signal is generated based on a third encoded sequence scrambled created by scrambling a second encoded sequence based on a second scrambler,
      wherein the second encoded sequence is generated by polar encoding a first sequence created by scrambling a PBCH payload based on a first scrambler, the PBCH payload indicating at least 3 bits of the SS block timing index and the first scrambler indicating at least 2 bits of the SS block timing index, and
      wherein the DMRS is generated based on a cell identifier and the least significant bits of the SS block timing index, wherein the DMRS sequence is generated by using random sequence initialized with the cell identifier and at least 2 bits of the SS block timing index; and performing a synchronization process with the network node based on the SS block timing index.

16. The apparatus of claim 15, wherein the first scrambler is based on the cell identifier.

17. The apparatus of claim 15, wherein the second scrambler is based on the cell identifier.

18. The apparatus of claim 15, wherein the second scrambler is based on the cell identifier and the least significant bits of a SS block index.

19. The apparatus of claim 15, wherein the second scrambler is based on least significant bits of a SS block index.

20. The apparatus of claim 15, wherein the second scrambler is initialized at a start of each SS block.

* * * * *